United States Patent
Takahashi

(10) Patent No.: US 10,393,264 B2
(45) Date of Patent: Aug. 27, 2019

(54) VEHICLE HAVING ENGINE UNIT

(71) Applicant: SUZUKI MOTOR CORPORATION, Hamamatsu-Shi, Shizuoka (JP)

(72) Inventor: Hideaki Takahashi, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 341 days.

(21) Appl. No.: 15/258,126

(22) Filed: Sep. 7, 2016

(65) Prior Publication Data
US 2017/0067560 A1    Mar. 9, 2017

(30) Foreign Application Priority Data

Sep. 8, 2015 (JP) ................. 2015-176945

(51) Int. Cl.
| | |
|---|---|
| F16H 63/30 | (2006.01) |
| F16H 57/02 | (2012.01) |
| F16H 61/04 | (2006.01) |
| F16H 63/18 | (2006.01) |
| B62M 7/00 | (2010.01) |
| F16H 61/682 | (2006.01) |

(52) U.S. Cl.
CPC .............. *F16H 63/18* (2013.01); *B62M 7/00* (2013.01); *F16H 63/304* (2013.01); *F16H 61/0437* (2013.01); *F16H 61/682* (2013.01); *F16H 2057/0203* (2013.01); *F16H 2057/02065* (2013.01); *F16H 2061/0462* (2013.01)

(58) Field of Classification Search
CPC .............. F16H 63/18; F16H 63/304; F16H 2057/0203; F16H 2057/02065; F16H 2061/0462
USPC .............................. 74/337.5, 606 R
See application file for complete search history.

(56) References Cited

U.S. PATENT DOCUMENTS

| | | | | |
|---|---|---|---|---|
| 7,478,717 | B2* | 1/2009 | Kunikiyo | F16D 25/082 |
| | | | | 192/83 |
| 8,662,233 | B2* | 3/2014 | Saitoh | F16H 3/006 |
| | | | | 180/226 |
| 9,091,308 | B2* | 7/2015 | Ogasawara | F16D 25/0638 |

(Continued)

FOREIGN PATENT DOCUMENTS

| | | |
|---|---|---|
| EP | 2857706 A1 | 4/2015 |
| JP | 2010260548 A | 11/2010 |

(Continued)

OTHER PUBLICATIONS

German Office Action dated Jul. 25, 2017 during the prosecution of German Patent Application No. 10 2016 116 841.6.

(Continued)

*Primary Examiner* — Ha Dinh Ho
(74) *Attorney, Agent, or Firm* — Troutman Sanders LLP

(57) ABSTRACT

An engine unit of a motorcycle has a crankcase and an overlying cylinder block. The crankcase has a magnet cover positioned outward of the cylinder block in the vehicle width direction as seen in the front-rear direction. The clutch actuator motor serving as a driving power source for a switching operation of the clutch is disposed inward of the side surface of the magnet cover in the vehicle width direction as seen in the front-rear direction. A part of the clutch actuator motor is positioned over the magnet cover.

18 Claims, 10 Drawing Sheets

(56) References Cited

U.S. PATENT DOCUMENTS

| | | | |
|---|---|---|---|
| 2007/0144285 A1* | 6/2007 | Mochizuki | F16H 61/32 |
| | | | 74/329 |
| 2007/0199755 A1* | 8/2007 | Takeuchi | F16D 48/06 |
| | | | 180/221 |
| 2008/0098837 A1 | 5/2008 | Hiroi et al. | |
| 2009/0127062 A1 | 5/2009 | Ishida | |

FOREIGN PATENT DOCUMENTS

| | | |
|---|---|---|
| JP | 2015010707 A | 1/2015 |
| JP | 2015-21561 A | 2/2015 |

OTHER PUBLICATIONS

Notice of Reasons for Refusal issued in corresponding Japanese Patent Application No. 2015-176945 dated May 9, 2019.

* cited by examiner

VEHICLE HAVING ENGINE UNIT

CROSS-REFERENCE TO RELATED APPLICATIONS

This application is based upon and claims the benefit of priority of the prior Japanese Patent Application No. 2015-176945, filed on Sep. 8, 2015, the entire contents of which are incorporated herein by reference.

BACKGROUND OF THE INVENTION

Field of the Invention

The present invention relates to a vehicle having an engine unit. In particular, the present invention relates to a vehicle having en engine unit provided with an automated manual transmission mechanism.

Description of the Related Art

An automated manual transmission (AMT) mechanism is known as a mechanism having both excellent power transmitting efficiency of a manual transmission mechanism and convenience of an automatic transmission mechanism. As discussed in Japanese Laid-open Patent Publication Nos. 2010-260548 and 2015-10707, the automated manual transmission mechanism applied to a motorcycle has a clutch actuator for actuating a clutch and a gearshift actuator for actuating a gearshift mechanism. These actuators are provided in the engine unit.

In particular, in the configuration of Japanese Laid-open Patent Publication No. 2010-260548, the clutch actuator is disposed between a crankcase and an intake system at the rear of a cylinder block. In addition, a part of the gearshift actuator protrudes outward from the cylinder block in a vehicle width direction at the rear of the cylinder block. In the technique of Japanese Laid-open Patent Publication No. 2010-260548, it may be possible to effectively use the dead space and miniaturize the engine unit by disposing these actuators in this manner.

Patent Document 1: Japanese Laid-open Patent Publication No. 2010-260548

Patent Document 2: Japanese Laid-open Patent Publication No. 2015-10707

However, if the clutch actuator is disposed at the rear of the cylinder block as discussed in Japanese Laid-open Patent Publication No. 2010-260548, it is difficult to expose the clutch actuator to the air blowing from the front, and the clutch actuator is easily influenced by the heat of the cylinder block. In addition, in the technique of Japanese Laid-open Patent Publication No. 2010-260548, in order to prevent the clutch actuator from being influenced by the heat from the cylinder block, the clutch actuator is installed in the engine unit using a bracket. However, such a configuration increases the number of components and the weight of the engine unit. Further, in the technique of Japanese Laid-open Patent Publication No. 2010-260548, the gearshift actuator is disposed at the rear of the cylinder block such that its axial line is approximately in parallel with a vehicle front-rear direction. In this configuration, it is difficult to obtain a space for the clutch actuator in a lateral side of the cylinder block and arrange the clutch actuator in a position where it is exposed to the air blowing from the front (that is, a position where the clutch actuator partially or entirely protrudes outward from the cylinder block in the vehicle width direction as seen from the front view). Furthermore, in the configuration of Japanese Laid-open Patent Publication No. 2010-260548, since each actuator actuates the clutch or the gearshift mechanism using a connecting member, a rod, or the like, the number of components increases.

SUMMARY OF THE INVENTION

In view of the aforementioned problems, it is therefore an object of the present invention to provide a vehicle having an engine unit provided with a manual transmission mechanism, capable of facilitating cooling of the clutch actuator and the gearshift actuator using the air blowing from the front by exposing the clutch actuator and the gearshift actuator to the air blowing from the front.

According to an aspect of the present invention, there is provided a vehicle having an engine unit, the engine unit having a crankcase provided with a crankshaft, a gearshift mechanism configured to perform a gearshift operation for rotary power transmitted from the crankshaft, and a clutch configured to connect or disconnect transmission of the rotary power between the crankshaft and the gearshift mechanism, a cylinder block internally provided with a cylinder and disposed on the crankcase, and a clutch actuator motor serving as a power source for switching the clutch between connection and disconnection states, wherein at least a part of the clutch actuator motor is positioned outward an cuter side surface of the cylinder block in a vehicle width direction as seen in a front-rear direction of the vehicle.

In the vehicle having the engine unit described above, an axial direction of a rotational shaft of the clutch actuator motor may be approximately in parallel with an axial direction of the cylinder of the cylinder block, and the clutch actuator motor may be disposed along a rear side of the cylinder block as seen in the vehicle width direction.

In the vehicle having the engine unit described above, the crankcase may have a portion positioned outward of the cylinder block in the vehicle width direction as seen in the front-rear direction of the vehicle, the clutch actuator motor may be disposed inward of an outer side surface of the portion of the crankcase in the vehicle width direction as seen in the front-rear direction of the vehicle, and a part of the clutch actuator motor may be positioned over the portion of the crankcase.

The vehicle having the engine unit described above may further include a power transmission member provided to rotate in synchronization with a rotation output shaft of the gearshift mechanism outside the crankcase and transmit rotation of the rotation output shaft to a propulsion wheel; and a covering member installed in the crankcase to cover the power transmission member. The clutch actuator motor may be disposed inward from the outermost side surface of the portion in the vehicle width direction outside the covering member in the vehicle width direction.

The vehicle having the engine unit described above may further include: a release cam rotated to switch the clutch between connection and disconnection states; a first driving gear provided in a rotational shaft of the clutch actuator motor and rotated in synchronization with the rotational shaft; and a first driven gear provided in the release cam and rotated in synchronization with the release cam. The first driving gear and the first driven gear may mesh with each other directly or by interposing a first intermediate gear, and the release cam may be rotated by the rotary power of the clutch actuator motor transmitted through the first driving gear and the first driven gear to switch the clutch between connection and disconnection states.

The vehicle having the engine unit described above may further include a gearshift actuator motor serving as a power source for changing a gearshift position of the gearshift mechanism. The crankcase may have a portion positioned outward of the cylinder block in the vehicle width direction as seen in the front-rear direction of the vehicle, and the gearshift actuator motor may be disposed at the rear of the cylinder block as seen in the vehicle width direction and inward of the outermost side surface of the portion of the crankcase in the vehicle width direction as seen in the front-rear direction of the vehicle.

In the vehicle having the engine unit described above, the gearshift actuator motor may be disposed at the rear of the clutch actuator motor as seen in the vehicle width direction, and the gearshift actuator motor may partially overlap with the clutch actuator motor as seen in the front-rear direction of the vehicle.

In the vehicle having the engine unit described above, an axial line of a rotational shaft of the gearshift actuator motor may be intersected with an axial line of a rotational shaft of the clutch actuator motor as seen in the front-rear direction of the vehicle.

The vehicle having the engine unit described above may further include: a power transmission member provided to rotate in synchronization with a rotation output shaft of the gearshift mechanism in a position different from that of the portion of the crankcase outside in the vehicle width direction and transmit rotation of the rotation output shaft to a propulsion wheel; and a covering member installed in the crankcase to cover the power transmission member. The gearshift actuator motor may be disposed outward of the covering member in the vehicle width direction.

The vehicle having the engine unit described above may further include: a shift cam rotated to change a gearshift position of the gearshift mechanism; a second driving gear provided in a rotational shaft of the gearshift actuator motor and rotated in synchronization with the rotational shaft; and a second driven gear provided in the shift cam and rotated in synchronization with the shift cam. The second driving gear and the second driven gear may mesh with each other directly or by interposing a second intermediate gear, and the shift cam may be rotated by the rotary power of the gearshift actuator motor transmitted through the second driving gear and the second driven gear to change the gearshift position of the gearshift mechanism.

DETAILED DESCRIPTION OF THE PREFERRED EMBODIMENTS

Embodiments of the present invention will now be described in detail with reference to the accompanying drawings. In the following description, a saddle type motorcycle will be described as a vehicle having an engine unit according to the present invention. The motorcycle according to an embodiment of the invention has an engine unit provided with an internal combustion engine as a driving power source, a clutch, and a gearshift mechanism. This engine unit is provided with an automated manual transmission mechanism in which the clutch and the gearshift mechanism are actuated by respective actuators. In the following description, the automated manual transmission mechanism will be simply referred to as an "AMT mechanism." In each drawing, the arrow "Fr" denotes a front side of the motorcycle, the arrow "Rr" denotes a rear side, the arrow "R" denotes a right side, and the arrow "L" denotes a left side, the arrow "Up" denotes an upward side, and the arrow "Dn" denotes a downward side as necessary.

<Configuration of Entire Motorcycle>

Figure 1:
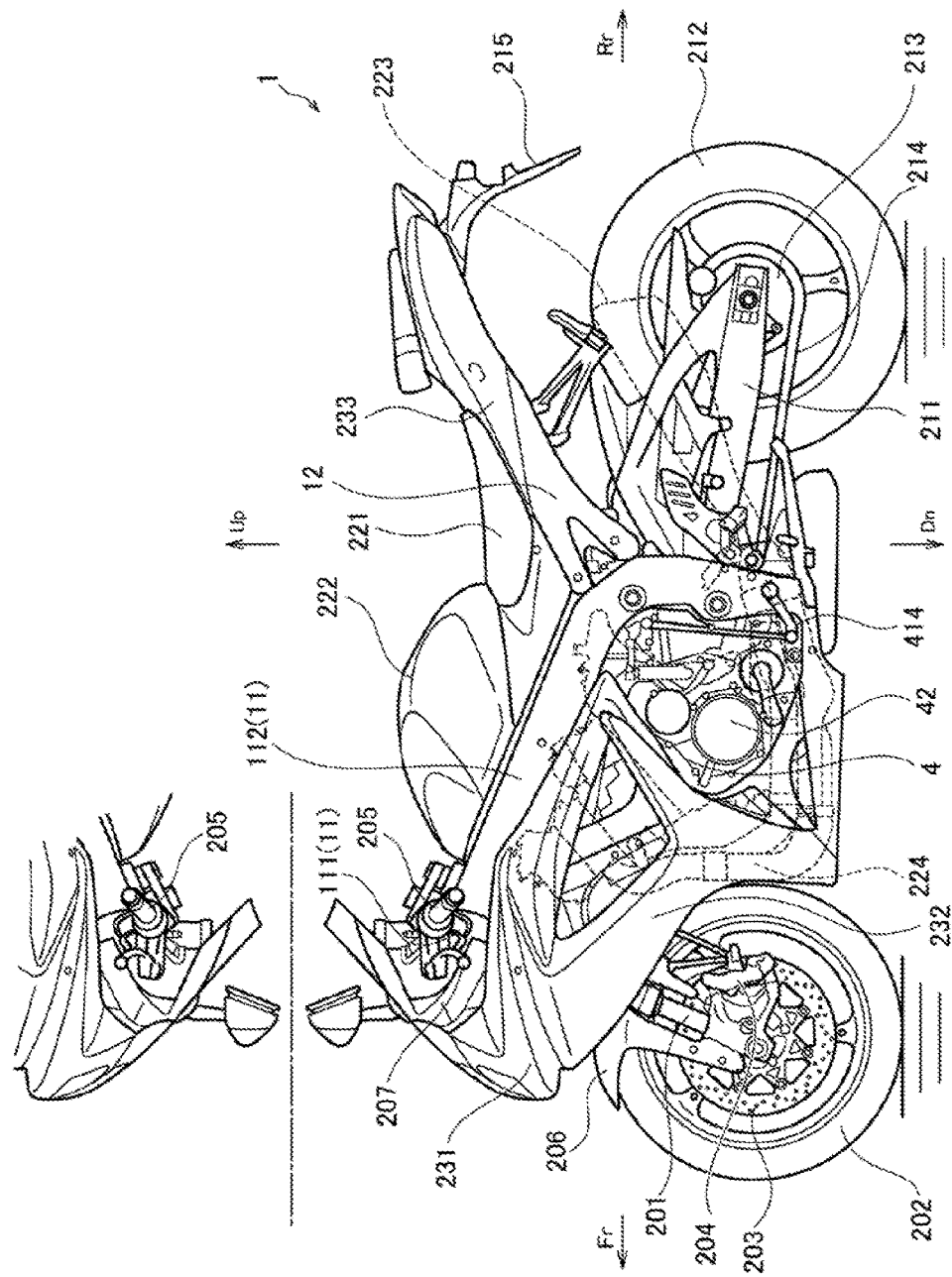
FIG. 1 is a left side view schematically illustrating an exemplary configuration of a motorcycle.

First, a configuration of the entire motorcycle 1 will be described with reference to FIG. 1. FIG. 1 is a left side view schematically illustrating an exemplary configuration of the motorcycle 1. In this embodiment, an on-road type motorcycle will be described.

A chassis 11 of the motorcycle 1 includes a steering head pipe 111 and a pair of left and right body frames 112. The steering head pipe 111 has a pipe shape inclined rearward. A pair of left and right body frames 112 has front ends bonded integrally to the steering head pipe 111 and extend rearward and obliquely downward from the steering head pipe ill with a gap widened in a vehicle width direction. A pair of left and right seat rails 12 is installed in rear parts of the body frames 112. A pair of left and right seat rails 12 support a seal 221 where a rider is seated and extend rearward and obliquely upward from the rear parts of the body frames 112 with a predetermined gap in the vehicle width direction. Each part of the chassis 11 is formed of steel, aluminum alloy, or the like, and they are bonded integrally by welding or the like.

In the front side of the chassis 11, a steering shaft (hidden and not shown in FIG. 1), a pair of left and right front forks 201, and a front wheel 202 are provided. The steering shaft is inserted into the steering head pipe 111 and is rotatably supported by the steering head pipe 111. A pair of left and right front forks 201 is connected to the steering shaft using a bracket or the like and is rotated in synchronization with the steering shaft. The front wheel 202 is rotatably supported by the lower ends of the pair of left and right front forks 201. The front wheel 202 is installed with a brake disk 203 that rotates in synchronization. The pair of left and right front forks 201 is installed with a brake caliper 204 and a front fender 206 that covers an upper side of the front wheel 202. In addition, upper ends of the pair of left and right front forks 201 are installed with left and right handle bars 205 (handle grips), respectively. The left handle bar 205 is provided with a clutch lever 207 for manipulating a clutch 51 described below, and the right handle bar 205 is installed with a brake lever for manipulating a brake of the rear wheel 212. Furthermore, a selector 414 for allowing a rider to manipulate a gearshift mechanism 52 described below is provided in the lower part on the left side of the vehicle width direction.

A front end of a swing arm 211 is vertically swingably (in a pitching direction) connected to the rear part of the chassis 11. A rear wheel 212 is rotatably supported by the rear end of the swing arm 211. A driven sprocket 213 rotating in synchronization with the rear wheel 212 is installed in the left side of the rear wheel 212. A drive chain 214 is looped around the driven sprocket 213 and a driving sprocket 46 (described below) of the engine unit 4. In addition, the rotary power output from the engine unit 4 is transmitted to the rear wheel 212 through the driving sprocket 46 and the drive chain 214. A shock absorber (not shown) is provided between the chassis 11 and the swing arm 211, so that a vibration or shock transmitted from the rear wheel 212 to the chassis 11 is absorbed or alleviated by the shock absorber. In addition, a rear fender 215 is provided above the rear wheel 212.

A seat 221 where a rider is seated is provided on the seat rails 12. A fuel tank 222 is provided on the body frames 112 in the front of the seat 221. Furthermore, the motorcycle 1 has exterior members such as a front fairing 231, a side fairing 232, and a seat fairing 233. The front fairing 231 covers the front part of the motorcycle 1, and the side fairing 232 covers the side part of the motorcycle 1. In addition, the seat fairing 233 covers the surrounding of the seat 221. Such exterior members are shell-like members formed of, for example, a synthetic resin material to provide exterior appearance of the motorcycle 1.

<Configuration of Engine Unit>

Figure 2:
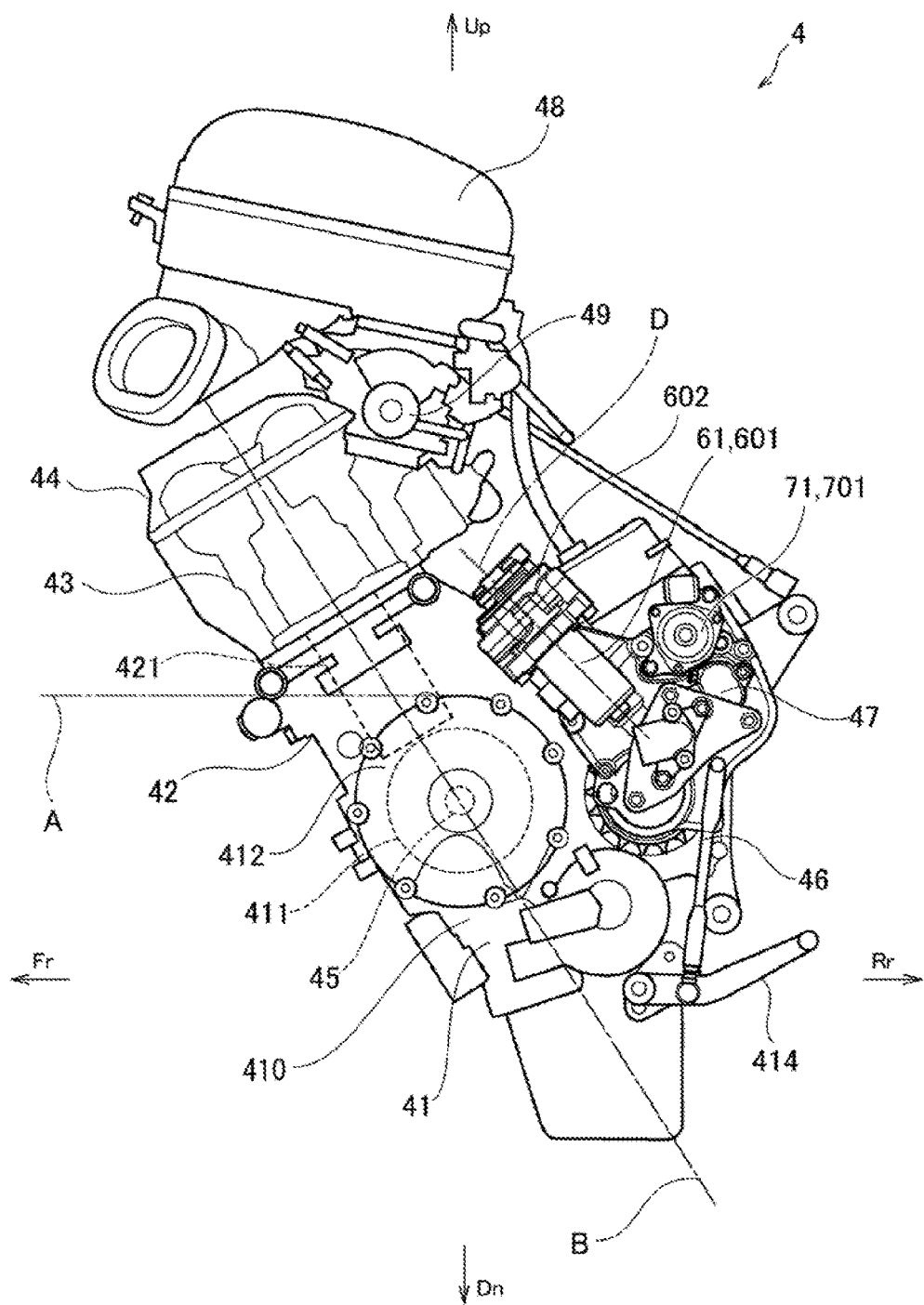
FIG. 2 is a left side view schematically illustrating exemplary configurations of main parts of the engine unit.
Figure 3:
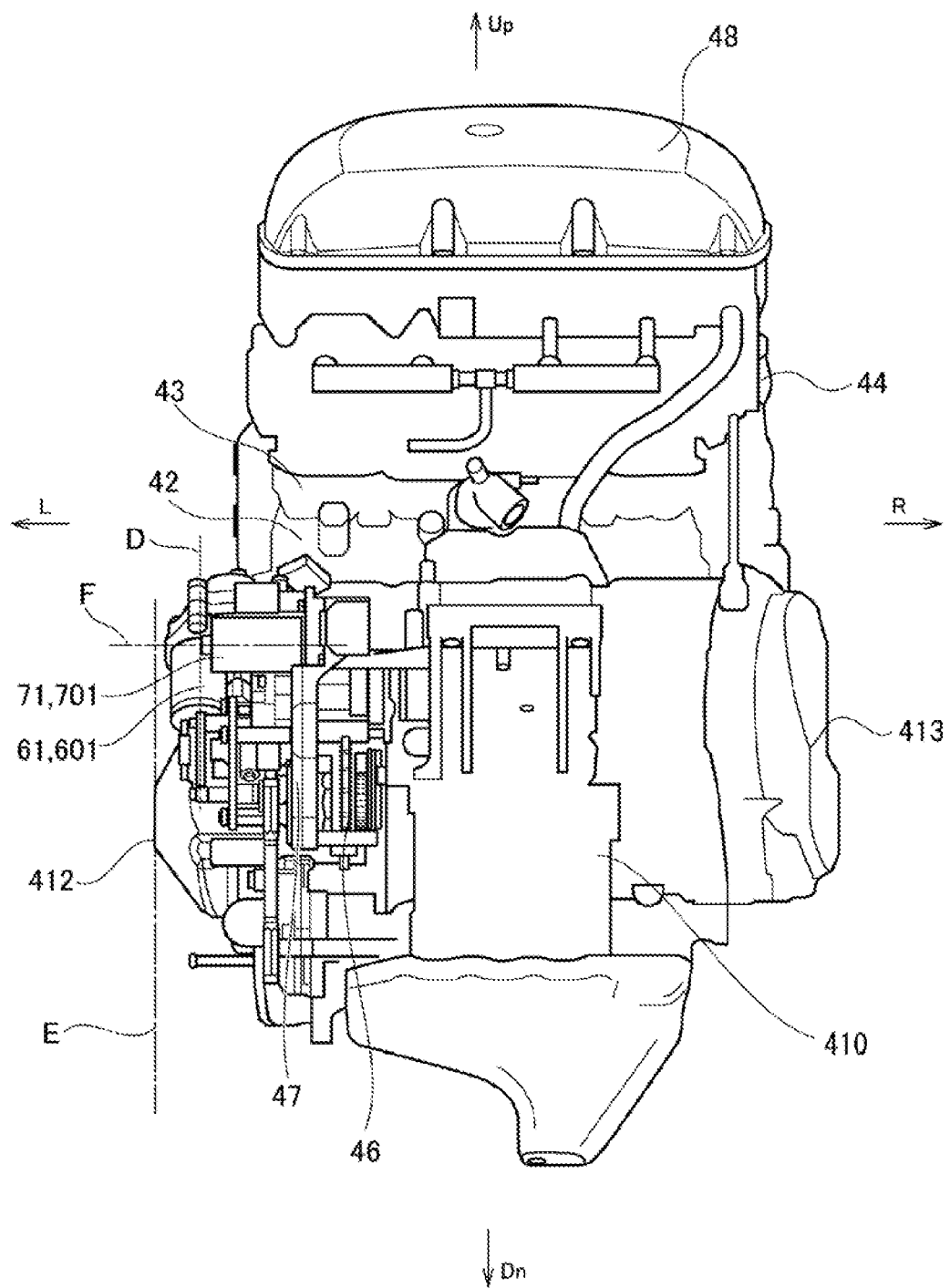
FIG. 3 is a rear view schematically illustrating exemplary configurations of the main parts of the engine unit.
Figure 4:
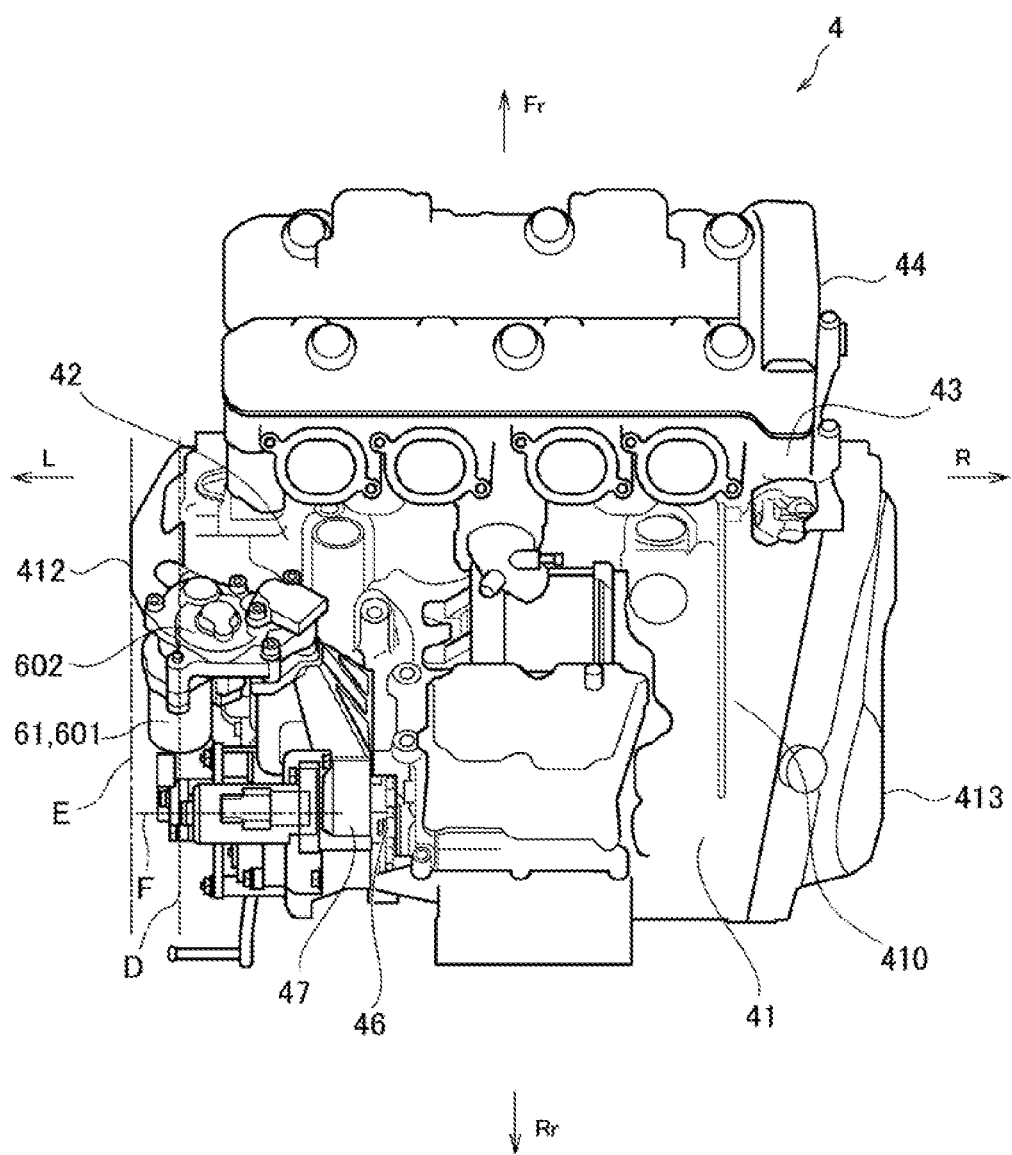
FIG. 4 is a top view schematically illustrating exemplary configurations of the main parts of the engine unit.

Next, an exemplary configuration of the engine unit 4 will be described. FIGS. 2 to 4 are diagrams schematically illustrating exemplary configurations of main parts of the engine unit 4. FIG. 2 is a left side view, FIG. 3 is a rear view, and FIG. 4 is a top view. The engine unit 4 is suspended to the chassis 11 using a plurality of engine mounts. The engine unit 4 also serves as a strength member of the motorcycle 1. In this embodiment, it is assumed that the engine unit 4 is a front exhaust type four-cylinder parallel engine (internal combustion engine) by way of example. As illustrated in FIGS. 2 to 4, the engine unit 4 includes a crankcase 41 (also referred to as a "crankcase assembly"), a cylinder block 42, a cylinder head 43, and a cylinder head cover 44.

The crankcase 41 (crankcase assembly) includes a casing body 410, a magnet cover 412 detachably installed in the casing body 410, and a clutch cover 413. A crank chamber is provided in the vicinity of the front side inside the casing body 410 of the crankcase 41, and a transmission chamber is provided in the vicinity of the rear side inside the casing body 410. A crankshaft 45 is rotatably housed in the crank chamber. Further, the crankshaft 45 is housed such that its axial line (rotation center line) is in parallel with the vehicle width direction (left-right direction). One end of the crankshaft 45 in the axial direction is installed with a primary driving gear 451 for transmitting rotary power to the gearshift mechanism 52 (transmission mechanism) to rotate in synchronization (refer to FIG. 7). A magnet 411 as an electric generator is connected to the other end of the crankshaft 45 opposite to the side in which the primary driving gear 451 is provided. In addition, the magnet 411 generates electricity by virtue of rotation of the crankshaft 45. Note that, in this embodiment, the primary driving gear 451 is installed in the right end of the crankshaft 45 in the vehicle width direction, and the magnet 411 is connected to the left end of the crankshaft 45 in the vehicle width direction.

The magnet cover 412 is installed in one side surface of the vehicle width direction of the casing body 410 of the crankcase 41 (the side surface of the side where the magnet 411 is connected to the crankshaft 45, that is, in this embodiment, the left side of the vehicle width direction). The magnet cover 412 is a member separate from the casing body 410 of the crankcase 41 and has an approximately circular shape as seen in the vehicle width direction and a bottomed box shape to form an internal space. In addition, the magnet cover 412 is detachably installed in the left side surface of the vehicle width direction of the casing body 410 of the crankcase 41 using a screw or the like. In particular, the magnet cover 412 protrudes outward from the left side surface of the cylinder block 42 in the vehicle width direction as illustrated in FIG. 3. That is, the outer side surface (end surface) of the magnet cover 412 in the vehicle width direction corresponds to generally the outermost side surface (end surface) of the vehicle width direction of the crankcase 41 (crankcase assembly).

Figure 5:
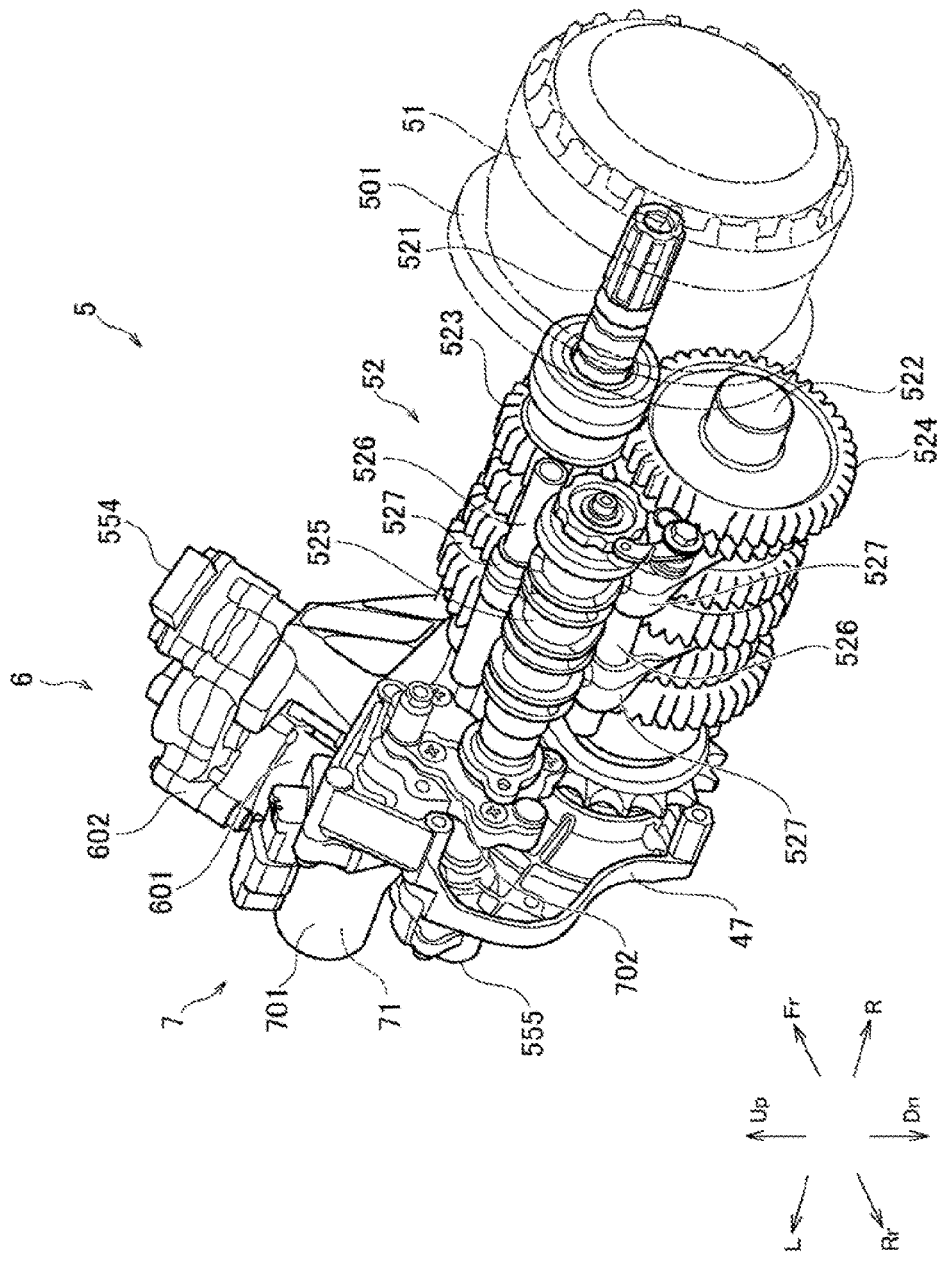
FIG. 5 is a perspective view schematically illustrating an exemplary configuration of an AMT mechanism.
Figure 6:
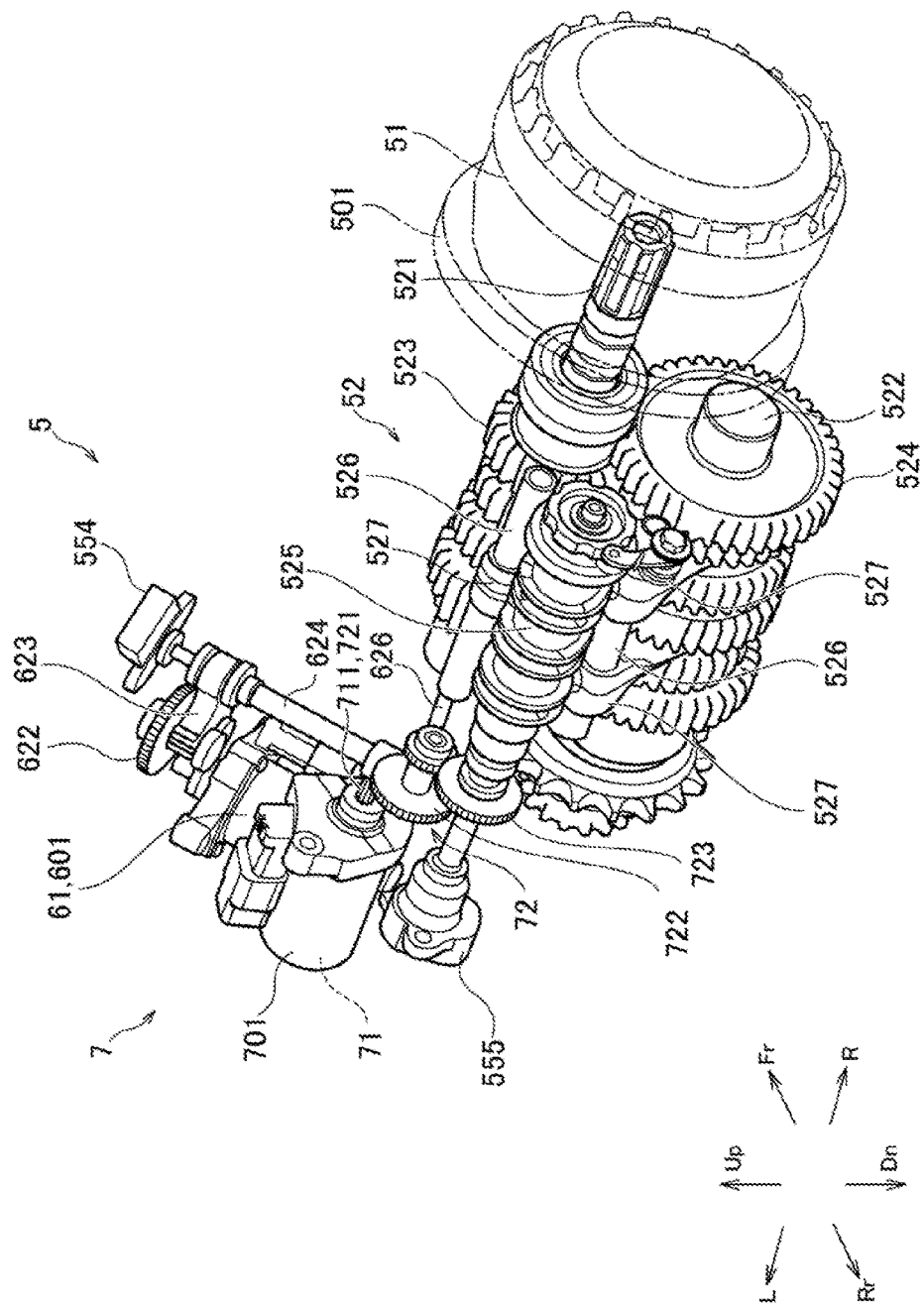
FIG. 6 is a diagram illustrating the AMT mechanism by removing some parts such as a sprocket cover from FIG. 5.

The clutch 51 and the gearshift mechanism 52 are provided inside the transmission chamber (refer to FIGS. 5 and 6). Using the clutch 51, connection or disconnection between the crankshaft 45 and the gearshift mechanism 52 is switched. The clutch 51 is provided in the vicinity of the right side of the crankcase 41 in the vehicle width direction (in the vicinity of a side opposite to the side where the magnet 411 is connected to the crankshaft 45). In addition, a clutch cover 413 is installed in the side surface of the side where the clutch 51 is provided in the casing body 410 of the crankcase 41. The clutch cover 413 is a member separate from the casing body 410 of the crankcase 41. Note that any shape of the clutch cover 413 may be employed without a limitation as long as it can cover the clutch 51. The gearshift mechanism 52 performs a gearshift operation for the rotary power transmitted from the crankshaft 45 through the clutch 51 to transmit the rotary power to the rear wheel 212 as a propulsion wheel. The gearshift mechanism 52 includes a countershaft 521 that receives the rotary power transmitted from the crankshaft 45 through the clutch 51 and a driveshaft 522 as an example of the rotation output shaft for outputting the rotary power to the rear wheel 212 as a propulsion wheel (refer to FIGS. 5 and 6). The axial lines (rotation center lines) of the countershaft 521 and the driveshaft 522 are in parallel with each other and also with the vehicle width direction.

One end of the driveshaft 522 in the vehicle width direction (the end in the same side where the magnet cover 412 is installed in the crankcase 41 and, in this embodiment, the left end of the vehicle width direction) protrudes outward of the casing body 410 of the crankcase 41 at the rear of the magnet cover 412. A driving sprocket 46 as an example of a power transmission member is installed in this protruding portion to rotate in synchronization with the driveshaft 522. In addition, a drive chain 214 is looped around the driving sprocket 46 of the driveshaft 522 and the driven sprocket 213 of the rear wheel 212. Note that, as illustrated in FIG. 3, the driving sprocket 46 is provided in a position different from that of the magnet cover 412, that is, in the center side relative to the outermost side surface (end surface) of the magnet cover 412 in the vehicle width direction as seen in the front-rear direction. In other words, the driving sprocket 46 is provided generally inward of the outermost side of the crankcase 41 in the vehicle width direction.

A sprocket cover 47 as an example of a covering member for covering the driving sprocket 46 is installed on one side surface of the casing body 410 of the crankcase 41 in the vehicle width direction in the side where the driveshaft 522 protrudes. The sprocket cover 47 has, for example, an approximately plate shape or a one-side-opened shallow-bottom box shape. In addition, the sprocket cover 47 is disposed outward from the driving sprocket 46 in the vehicle width direction and apart from the outer side surface of the casing body 410 of the crankcase 41 to the outside in the vehicle width direction. For example, the sprocket cover 47 is detachably installed in the casing body 410 of the crankcase 41 using a screw or the like by interposing a spacer having a tubular or columnar shape. Note that such a spacer may be formed integrally with the sprocket cover 47 or may be provided integrally with the casing body 410 of the crankcase 41. In addition, any shape of the sprocket cover 47 may be employed without a particular limitation as long as it can cover the outside of the driving sprocket 46 in the vehicle width direction. Shortly to say, it is preferable that the sprocket cover 47 have a portion that covers the outer side of the driving sprocket 46 in the vehicle width direction, and this portion be positioned outward apart from one side surface of the casing body 410 of the crankcase 41 in the vehicle width direction.

Further, the driveshaft 522 of the gearshift mechanism 52 is disposed at the rear of the crankshaft 45. For this reason, as described above, one end of the driveshaft 522 protrudes outward the casing body 410 of the crankcase 41 at the rear of the magnet cover 412 (refer to FIG. 2). Therefore, the driving sprocket 46 is positioned at the rear of the magnet cover 412, and the sprocket cover 47 is installed at the rear of the magnet cover 412. As illustrated in FIGS. 3 and 4, the outer side surface of the sprocket cover 47 in the vehicle width direction is positioned inward of the outer side surface of the magnet cover 412 located in the outermost side of the crankcase 41 in the vehicle width direction (the outermost side surface in the vehicle width direction). The straight line E of FIG. 3 indicates a position of the outer side surface of the magnet cover 412 in the vehicle width direction.

The cylinder block 42 is provided on the vicinity of the front side of the casing body 410 of the crankcase 41 (that is, where the crank chamber is provided). Inside the cylinder block 42, a plurality of cylinders 421 (in this embodiment, four cylinders) are arranged side by side in a line along the vehicle width direction. Axial lines B of the plurality of cylinders 421 are in parallel with each other and are inclined frontward as seen in the vehicle width direction as illustrated in FIG. 2. A piston (not shown) is housed inside each cylinder 421 in a reciprocatable manner and is connected to the crankshaft 45 through a connecting rod. A cylinder head 43 overlies the cylinder block 42. In the cylinder head 43, an intake port as a passage for a gas mixture of fuel and air, an exhaust port as a passage for the exhaust gas, valves for opening or closing these passages, and a valve driving mechanism for driving for opening or closing the valves are provided for each of the cylinders 421. According to this embodiment, the intake port is provided in the rear side of the cylinder head 43, and the exhaust port is provided in the front side. A cylinder head cover 44 is provided on the cylinder head 43. The cylinder head cover 44 covers the valve driving mechanism provided in the cylinder head 43 and the like.

An air cleaner 48 is provided over the cylinder head 43 and the cylinder head cover 44. The air cleaner 48 receives and purifies the combustion air used in the engine unit 4. The air cleaner 48 and each intake port are connected to each other through an intake passage such that the air can pass therebetween. In addition, each intake passage is provided with a throttle body 49 for controlling a flow rate of the combustion air. In this configuration, the air flowing to the air cleaner 48 flows to each cylinder 421 from each intake port while a flow rate of the air is controlled by the throttle body 49.

An exhaust pipe 224 as a passage for guiding the exhaust gas to the sound muffler 223 is connected to the exhaust port provided in the front surface side of the cylinder head 43. The sound muffler 223 is connected to the rear end of the exhaust pipe 224. The exhaust gases generated in each cylinder 421 are discharged to the outside through the exhaust ports of each cylinder 421, the exhaust pipe 224, and the sound muffler 223.

As described above, the engine unit 4 has the crankcase 41 and the cylinder block 42, and the cylinder block 42 is provided on the vicinity of the front side of the crankcase 41. For this reason, the engine unit 4 has a generally "L-shape" as seen in the vehicle width direction. Specifically, the cylinder block 42, the cylinder head 43, and the cylinder head cover 44 are included in a vertical line of the "L-shape," and the crankcase 41 is included in a horizontal line of the L-shape." In addition, the crankshaft 45 is positioned in a corner of the "L-shape." Furthermore, the magnet cover 412 that covers the magnet 411 is installed in one side surface of the casing body 410 of the crankcase 41 in the vehicle width direction (in this embodiment, the left side surface of the vehicle width direction). In particular, the magnet cover 412 protrudes outward of the side surface of the cylinder block 42 in the vehicle width direction (the outermost portion of the vehicle width direction) as illustrated in FIGS. 3 and 4. That is, the outer side surface of the magnet cover 412 in the vehicle width direction (indicated by the straight line E in FIG. 3) is positioned outward of the outer side surface of the cylinder block 42 in the vehicle width direction.

In this manner, the crankcase 41 has a portion (magnet cover 412) protruding outward of the side surface of the cylinder block 42 in the vehicle width direction. In addition, the driving sprocket 46 as an example of a power transmission member is positioned at the rear of the protruding portion (magnet cover 412), and the sprocket cover 47 that covers the driving sprocket 46 is installed therein.

<Configuration of AMT Mechanism>

The AMT mechanism 5 includes a clutch 51, a clutch driving mechanism 6 that switches the clutch 51 between connection and disconnection states, a gearshift mechanism 52, and a gearshift driving mechanism 7 that changes a gearshift position of the gearshift mechanism 52. The clutch driving mechanism 6 has a clutch actuator motor 61 as a driving power source for the connection/disconnection switching operation of the clutch 51 and a first driving force transmission mechanism 62 that transmits the rotary power of the clutch actuator motor 61 to the clutch 51. The gearshift driving mechanism 7 has a gearshift actuator motor 71 as a driving power source for the gearshift position change operation of the gearshift mechanism 52 and a second driving force transmission mechanism 72 that transmits the rotary power of the gearshift actuator motor 71 to the gearshift mechanism 52. The clutch actuator motor 61 and gearshift actuator motor 71 are installed on the outer side surface of the vehicle width direction of the sprocket cover 47 while they are housed in the first and second motor casings 601 and 701, respectively. Note that any one of various motors known in the art such as a servo motor is employed as the clutch actuator motor 61 and the gearshift actuator motor 71.

(Arrangement of Clutch Actuator Motor)

Here, an arrangement of the clutch actuator motor 61 will be described. The clutch actuator motor 61 is installed on the outer side surface of the vehicle width direction of the sprocket cover 47 while it is housed in the first motor casing 601. In addition, the clutch actuator motor 61 is detachably installed in the sprocket cover 47 using a screw or the like. Note that any configuration may be employed in the first motor casing 601 without a particular limitation as long as it can house the clutch actuator motor 61. As illustrated in FIG. 2, at least a part of the clutch actuator motor 61 is disposed to protrude upward of the upper edge of the magnet cover 412. The straight line A of FIG. 2 indicates a position of the upper edge of the magnet cover 412. As illustrated in FIG. 3, at least a part of the clutch actuator motor 61 is disposed to protrude outward of one side surface of the cylinder block 42 in the vehicle width direction as seen in the front-rear direction. However, the clutch actuator motor 61 is positioned inward of the outer side surface of the magnet cover 412 in the vehicle width direction (the position indicated by the straight line E in FIG. 3) as seen in the front-rear direction. In other words, the clutch actuator motor 61 is disposed not to protrude outward from the outer side surface of the magnet cover 412 in the vehicle width direction as seen in the front-rear direction. As described above, the outer side surface of the magnet cover 412 in the vehicle width direction is positioned outward of the outer side surface of the cylinder block 42 in the vehicle width direction. For this reason, as seen in the front-rear direction of the motorcycle 1, at least a part of the clutch actuator motor 61 is positioned outward of the cylinder block 42 in the vehicle width direction over the magnet cover 412.

Note that a part of the clutch actuator motor 61 may be positioned outward of the outer side surface of the cylinder block 42 in the vehicle width direction as seen in the front-rear direction of the motorcycle 1, and the entire clutch actuator motor 61 may not be positioned outward of the outer side surface of the cylinder block 42 in the vehicle width direction. However, the clutch actuator motor 61 is disposed not to entirely protrude outward of the outer side surface of the magnet cover 412 in the vehicle width direction (the position indicated by the straight line E in FIG. 3) as seen in the front-rear direction of the motorcycle 1.

In this configuration, if the engine unit 4 is seen from the front, at least a part of the clutch actuator motor 61 is positioned outward of the cylinder block 42 in the vehicle width direction over the magnet cover 412. Therefore, as seen from the front side of the motorcycle 1, at least a part of the clutch actuator motor 61 is exposed without being hidden behind the cylinder block 42 or the magnet cover 412. For this reason, the clutch actuator motor 61 is easily exposed to the air from the front, and cooling of the clutch actuator motor 61 is facilitated during the driving of the motorcycle 1.

The clutch actuator motor 61 is installed on the outer side surface of the sprocket cover 47 in the vehicle width direction. As described above, the sprocket cover 47 is apart outward from the side surface of the casing body 410 of the crankcase 41 in the vehicle width direction. For this reason, the heat transmitted from the casing body 410 of the crankcase 41 to the clutch actuator motor 61 (for example, the heat from the cylinder block 42) is reduced. In this manner, it is possible to prevent the clutch actuator motor 61 from being easily influenced by the heat of the engine unit 4. For example, is possible to suppress degradation of performance caused by a temperature increase. In addition, the outermost side position of the clutch actuator motor 61 in the vehicle width direction is positioned inward of the outer side surface of the magnet cover 412 in the vehicle width direction (the outermost position of the vehicle width direction, that is, the position indicated by the straight line E in FIG. 3). For this reason, the size of the engine unit 4 (in particular, the crankcase 41) does not increase in the vehicle width direction. In this configuration, it is possible to improve the cooling effect of the clutch actuator motor 61 without increasing the size of the engine unit 4 (in particular, the size in the vehicle width direction).

In this configuration, it is possible to allow access to the clutch driving mechanism 6 including the clutch actuator motor 61 from the outside in the vehicle width direction. In addition, it is possible to install or uninstall the clutch driving mechanism 6 including the clutch actuator motor 61 from the outside in the vehicle width direction. Therefore, it is possible to facilitate maintenance or inspection of the clutch driving mechanism 6 including the clutch actuator motor 61.

The axial line D of the rotational axis 611 of the clutch actuator motor 61 is approximately in parallel with the axial line B of the cylinder 421 provided in the cylinder block 42. That is, as seen in the vehicle width direction, both the axial line B of the cylinder 421 provided in the cylinder block 42 and the axial line D of the rotational axis 611 of the clutch actuator motor 61 are in parallel with the vertical direction as seen in the front-rear direction and are inclined frontward with respect to the vertical direction as seen in the vehicle width direction. In particular, as illustrated in FIG. 2, the clutch actuator motor 61 is disposed along the rear surface of the cylinder block 42 as seen in the vehicle width direction. In this manner, the clutch actuator motor 61 is arranged side by side to follow the cylinder block 42 outside and at the rear of the cylinder block 42 in the vehicle width direction.

In this configuration, the clutch actuator motor 61 is easily exposed to the air circulated through the lateral sides of the cylinder block 42 during the driving without increasing the size protruding outward from the cylinder block 42 in the vehicle width direction. For this reason, it is possible to facilitate cooling of the clutch actuator motor 61. In addition, in this configuration, it possible to increase a space behind the clutch actuator motor 61. For this reason, other devices can be disposed in this space. Therefore, it is possible to effectively use this space.

The clutch actuator motor 61 is installed on the outer side surface of the sprocket cover 47 in the vehicle width direction. The sprocket cover 47 is apart from the outer side surface of the casing body 410 of the crankcase 41 in the vehicle width direction with a predetermined gap by interposing a spacer or the like. In this configuration, it is possible to reduce the heat transmitted from the casing body 410 of the crankcase 41 to the clutch actuator motor 61 and the gearshift actuator motor 71. Therefore, it is possible to prevent the clutch actuator motor 61 from being influenced by the heat from the casing body 410 of the crankcase 41. For example, it is possible to suppress degradation of performance caused by the temperature increase.

(Arrangement of Gearshift Actuator Motor)

Next, an arrangement of the gearshift actuator motor 71 will be described. The gearshift actuator motor 71 is installed on the outer side surface of the sprocket cover 47 in the vehicle width direction while it is housed in the second motor casing 701. In addition, the gearshift actuator motor 71 is detachably installed in the sprocket cover 47 using a screw or the like. Note that any configuration may be employed in the second motor casing 701 without a specific limitation as long as it can house the gearshift actuator motor 71. The gearshift actuator motor 71 partially overlaps with the cylinder block 42 as seen in the front-rear direction (in the vicinity of the center of the vehicle width direction), and the remaining part (the portion in the vicinity of the outer side in the vehicle width direction) protrudes outward from the outer side surface of the cylinder block 42 in the vehicle width direction. Similar to the clutch actuator motor 61, at least a part of the gearshift actuator motor 71 protrudes upward of the upper edge of the magnet cover 412 (in the position indicated by the straight line A in FIG. 2). Note that, in FIG. 2, the entire gearshift actuator motor 71 is disposed over the upper edge of the magnet cover 412. However, any configuration may be employed as long as at least a part of the gearshift actuator motor 71 protrudes upward of the upper edge of the magnet cover 412, and the entire gearshift actuator motor 71 may not be positioned over the upper edge of the magnet cover 412.

The gearshift actuator motor 71 is disposed inward of the outer side surface of the magnet cover 412 in the vehicle width direction (the position indicated by the straight line E in FIG. 3) as seen in the front rear direction. In other words, as seen in the front-rear direction, the gearshift actuator motor 71 is disposed not to protrude outward from the outer side surface of the magnet cover 412 positioned in the outermost side of the crankcase 41 in the vehicle width direction. In this configuration, at least a part of the gearshift actuator motor 71 is positioned outward of the cylinder block in the vehicle width direction over the upper edge of the magnet cover 412 as seen in the front-rear direction.

The gearshift actuator motor 71 is disposed at the rear of the clutch actuator motor 61 as illustrated in FIG. 2. As illustrated in FIG. 3, the portion of the gearshift actuator motor 71 that is disposed in the vicinity of the outer side in the vehicle width direction and protrudes outward from the side surface of the cylinder block 42 in the vehicle width direction overlaps with the clutch actuator motor 61 as seen in the front-rear direction. Note that the gearshift actuator motor 71 is arranged such that its rotational axis 711 has an axial line F directed in parallel with the axial line of the shift cam 525 of the gearshift mechanism 52, that is, in parallel with the vehicle width direction (refer to FIGS. 5 and 6). Meanwhile, the axial line D of the rotational axis 611 of the clutch actuator motor 61 is arranged in parallel with the vertical direction as seen in the front-rear direction and in parallel with the front-rear direction as seen in the vertical direction. For this reason, as seen either in the front-rear direction or in the vertical direction, the axial line F of the rotational axis 711 of the gearshift actuator motor 71 is intersected with the axial line D of the rotational axis 611 of the clutch actuator motor 61.

In this configuration, it is possible to obtain the effects similar to those of the clutch actuator motor 61 in terms of cooling or maintenance. That is, if the engine unit 4 is seen from the front, a part of the gearshift actuator motor 71 is positioned outside the cylinder block 42 in the vehicle width direction over the magnet cover 412. For this reason, the gearshift actuator motor 71 is easily exposed to the air blowing from the front during the driving of the motorcycle 1, so that the gearshift actuator motor 71 is easily cooled. In addition, the gearshift actuator motor 71 is installed on the outer side surface of the sprocket cover 47 as an example of a covering member in the vehicle width direction. For this reason, similar to the clutch actuator motor 61, it is possible to reduce the heat transmitted through the casing body 410 of the crankcase 41. Therefore, it is possible to prevent the heat from being easily transmitted from the engine unit 4. For example, it is possible to suppress degradation of performance caused by the temperature increase. In addition, the outermost position of the gearshift actuator motor 71 in the vehicle width direction is positioned inward of the outer side surface of the magnet cover 412 in the vehicle width direction (the position indicated by the straight line E in FIG. 3). For this reason, the size of the entire engine unit 4 in the vehicle width direction does not increase. Therefore, in this configuration, it is possible to improve the cooling effect of the gearshift actuator motor 71 without increasing the size of the engine unit 4 (in particular, the size in the vehicle width direction).

In this configuration, it is possible to easily access or install/uninstall the gearshift driving mechanism 7 including the gearshift actuator motor 71 from the outside in the vehicle width direction. Therefore, it is possible to facilitate maintenance or inspection.

The clutch actuator motor 61 and the gearshift actuator motor 71 are arranged apart from each other in the front-rear direction and overlap with each other as seen in the front-rear direction. In this configuration, it is possible to reduce the portions of the clutch actuator motor 61 and the gearshift actuator motor 71 protruding outward in the vehicle width direction. Therefore, there is no need to increase the size of the engine unit 4 in the vehicle width direction.

The axial line D of the rotational axis 611 of the clutch actuator motor 61 and the axial line F of the rotational axis 711 of the gearshift actuator motor 71 are not in parallel with each other, but are intersected with each other as seen in the front-rear direction or in the vertical direction. That is, as seen in the front-rear direction, the gearshift actuator motor 71 and the clutch actuator motor 61 do not entirely overlap with each other, but partially overlap with each other. In this configuration, compared to the entirely overlapping configuration, the gearshift actuator motor 71 disposed at the rear of the clutch actuator motor 61 is easily exposed to the air blowing from the front. Therefore, it is possible to obtain the cooling effect of the gearshift actuator motor 71 while suppressing a size increase of the engine unit 4.

The engine unit 4 may be covered by an exterior member such as a side fairing 232, in which a cooling air circulation passage is provided. According to the embodiment of the present invention, the clutch actuator motor 61 and the gearshift actuator motor 71 are arranged side by side along the front-rear direction (that is, along the direction of the air flow caused by the driving). Therefore, it is possible to simplify the air circulation structure provided in the exterior member.

As described above, according to the embodiment of the present invention, it is possible to improve the cooling effect in the clutch actuator motor 61 and the gearshift actuator motor 71 without increasing the size of the engine unit 4, particularly, in the vehicle width direction. In addition, it is possible to prevent the clutch actuator motor 61 and the gearshift actuator motor 71 from being influenced by the heat from the engine unit 4. For example, it is possible to suppress degradation of performance caused by a temperature increase.

(Configurations of Each Part of AMT Mechanism)

Figure 7:
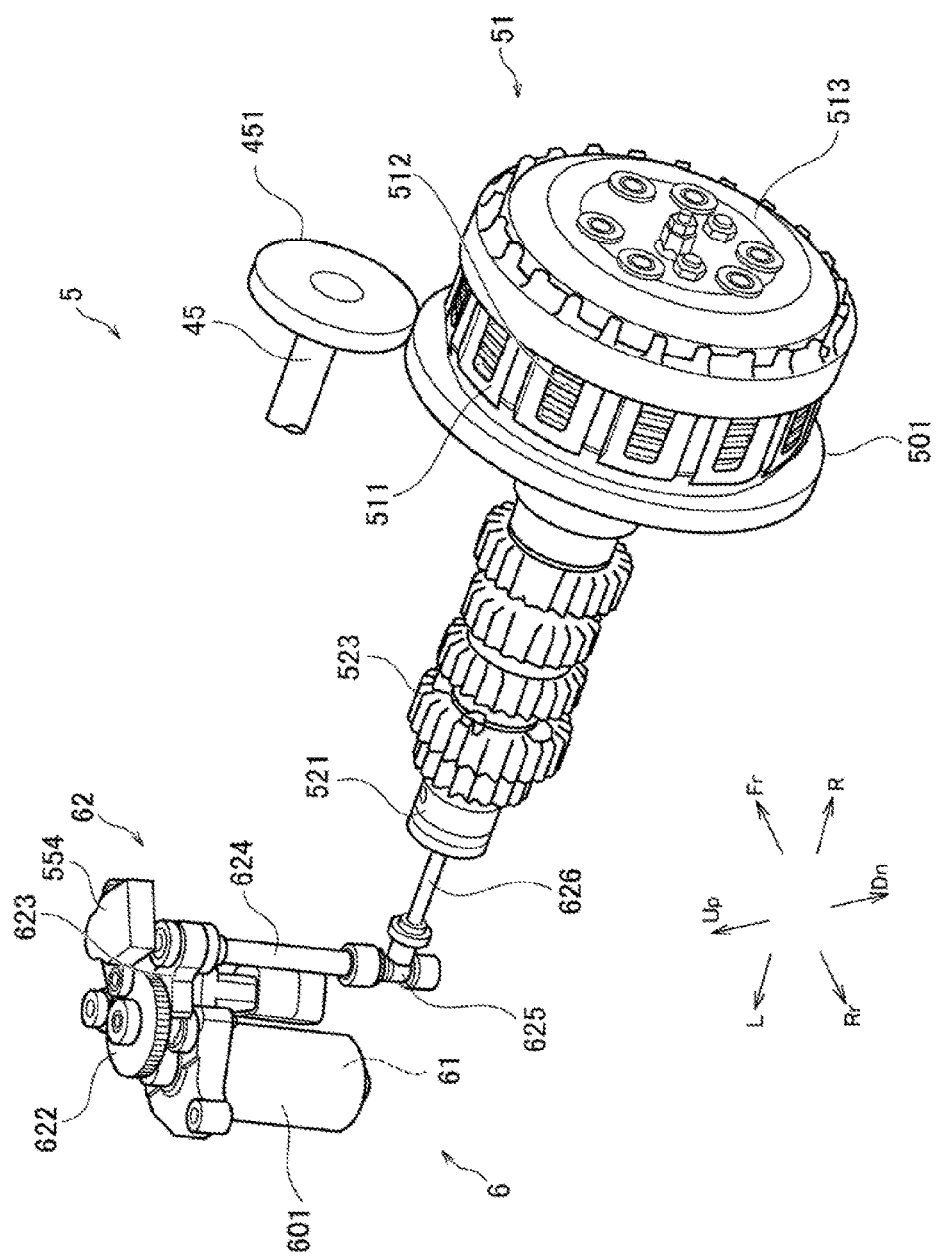
FIG. 7 is a perspective view schematically illustrating exemplary configurations of a clutch and a clutch driving mechanism of the AMT mechanism.
Figure 8:
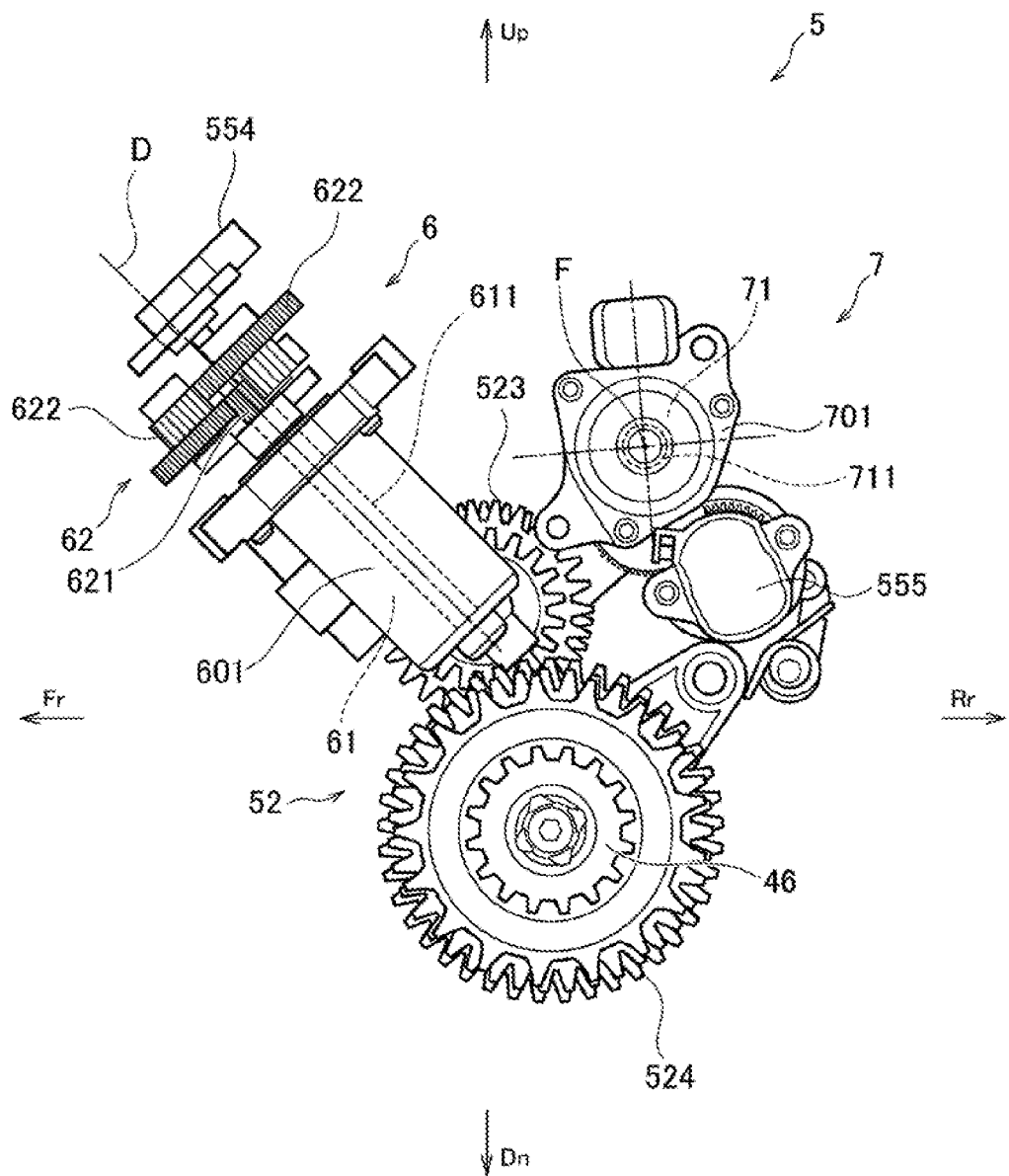
FIG. 8 is a left side view schematically illustrating exemplary configurations of the clutch driving mechanism and the gearshift driving mechanism of the AMT mechanism.

Next, configurations of each part of the AMT mechanism 5 will be described with reference FIGS. 5 to 8. FIG. 5 is a perspective view schematically illustrating an exemplary configuration of the AMT mechanism 5. FIG. 6 is a diagram illustrating the AMT mechanism 5 by omitting a part of members such as the sprocket cover 47 from FIG. 5. FIG. 7 is a perspective view schematically illustrating exemplary configurations of the clutch 51 and the clutch driving mechanism 6 of the AMT mechanism 5. FIG. 8 is a left side view schematically illustrating exemplary configurations of the clutch driving mechanism 6 and the gearshift driving mechanism 7 of the AMT mechanism 5.

(Clutch)

As illustrated in FIGS. 5 to 8, the clutch 51 is provided in the right end of the countershaft 521 in the vehicle width direction (that is, the end opposite to the side where the driveshaft 522 protrudes) and coaxially with the countershaft 521. According to this embodiment, a wet multi-plate clutch is employed as the clutch 51 by way of example. In addition, the clutch 51 is switched between connection and disconnection states of the rotary power between the crankshaft 45 and the countershaft 521 by axially moving a push rod 626 (also referred to as a "clutch rod") housed in the countershaft 521 which is a hollow shaft.

As illustrated in FIG. 7, the clutch 51 has a clutch housing 511, a clutch sleeve hub (hidden and not shown in FIG. 7), and a pressure disk 513. The clutch housing 511 is provided in the right end of the countershaft 521 in the vehicle width direction. In addition, the clutch housing 511 is coaxial with the countershaft 521 so that it can rotate relative to the countershaft 521. In the inner circumferential side of the clutch housing 511, a plurality of driving plates 512 are arranged side by side in the axial direction of the countershaft 521. In addition, the clutch housing 511 is combined with a primary driven gear 501 by interposing a shock absorbing mechanism such as a spring so that it rotates in synchronization with the primary driven gear 501. The primary driven gear 501 meshes with the primary driving gear 451 provided in the crankshaft 45 so that the rotary power of the crankshaft 45 is transmitted to the clutch 51. The clutch sleeve hub is provided in the inner circumferential side of the clutch housing 511 to rotate in synchronization with the countershaft 521. In the clutch sleeve hub, a plurality of driven plates is arranged side by side along the axial direction. A plurality of driving plates 512 provided in the clutch housing 511 and a plurality of driven plates provided in the clutch sleeve hub are arranged alternatingly along the axial direction of the countershaft 521. The pressure disk 513 is provided outward of the clutch housing 511 and the clutch sleeve hub in the vehicle width direction (in the right side of the vehicle width direction) to be displaceable relative to the countershaft 521 in the axial direction. Between the pressure disk 513 and the clutch sleeve hub, a biasing member such as a coil spring is provided. In addition, the pressure disk 513 is biased to the center side of the vehicle width direction (the left side of the vehicle width direction) by virtue of the biasing force of the biasing member, so that the driving plate 512 and the driven plate are maintained in a contact state with a predetermined pressure in the axial direction.

The push rod 626 is housed in the countershaft 521, which is a hollow shaft, reciprocatably along its axial direction. The push rod 626 is shifted to the right in the vehicle width direction as a release cam 624 described below is rotated, so as to press and move the pressure disk 513 outward of the vehicle width direction (to the right side of the vehicle width direction).

While the push rod 626 does not push the pressure disk 513, the driving plate 512 and the driven plate are maintained in a contact state with a predetermined pressure in the axial direction by virtue of the biasing force of the biasing member. In this state, the rotary power of the crankshaft 45 is transmitted to the countershaft 521 through the primary driving gear 451, the primary driven gear 501, the clutch housing 511, the driving plate 512, the driven plate, and the clutch sleeve hub. This state is a so-called "clutch-connected" state.

As the pressure disk 513 is pushed by the push rod 626 and moves to the right side of the vehicle width direction, a contact pressure between the driving plate 512 and the driven plate is reduced. For this reason, the clutch 51 is switched from a state in which the rotary power of the crankshaft 45 is transmitted to the countershaft 521 to a state in which the rotary power is transmitted, but is not perfectly transmitted. This state is a so-called "half-clutch" state. As the pressure disk 513 is pushed by the push rod 626 and further moves to the right side of the vehicle width direction, the contact pressure between the driving plate 512 and the driven plate is eliminated. In addition, the clutch 51 is switched to a state in which the rotary power of the crankshaft 45 is not transmitted to the countershaft 521. This state is a so-called "clutch-disconnected" state. According to this embodiment, a clutch driving mechanism 6 described below moves the push rod 626 to the right side of the vehicle width direction, so that connection/disconnection state of the clutch 51 is switched.

Note that the configuration of the clutch 51 described above is just for illustrative purposes, and any configuration may be employed without a limitation. Shortly to say, any configuration may be employed as long as the rotary power connection/disconnection can be switched by moving a predetermined member such as the pressure disk 513 in the axial direction.

(Clutch Driving Mechanism)

The clutch driving mechanism 6 has a clutch actuator motor 61 and a first driving force transmission mechanism 62. The clutch actuator motor 61 is a driving power source for the rotary power connection/disconnection switching operation of the clutch 51. The first driving force transmission mechanism 62 transmits the rotary power of the clutch actuator motor 61 to the clutch 51. The first driving force transmission mechanism 62 has a first driving gear 621 provided in the rotational shaft 611 of the clutch actuator motor 61, a release cam 624 provided with a first driven gear 623, and a first intermediate gear 622 meshing with the first driving gear 621 and the first driven gear 623. In addition, the clutch driving mechanism 6 has a first gear casing 602 for housing each member of the first driving force transmission mechanism 62. The rotary power of the clutch actuator motor 61 is transmitted to the release cam 624 through the first driving gear 621, the first intermediate gear 622, and the first driven gear 623. The release cam 624 is rotated by the rotary power of the clutch actuator motor 61 to push the push rod 626 to the right side of the vehicle width direction. As a result, the connection/disconnection state of the clutch 51 is switched.

A specific configuration of the first driving force transmission mechanism 62 will be described. The first driving gear 621 is installed in the rotational shaft 611 of the clutch actuator motor 61 through spline coupling or the like to rotate in synchronization with each other. The release cam 624 is a bar-shaped member rotatably supported by the first gear casing 602. Note that the axial line (rotation center line) of the release cam 624 is in parallel with the axial line of the rotational shaft 611 of the clutch actuator motor 61. That is, the axial line of the release cam 624 is in parallel with the vertical direction as seen in the front-rear direction and is inclined frontward relative to the vertical direction as seen in the vehicle width direction. In addition, the first driven gear 623 is provided to rotate in synchronization in the vicinity of the upper end of the release cam 624 in the axial direction. In addition, a cam body 525 is provided to rotate in synchronization in the vicinity of the lower end in the axial direction. The cam body 625 abuts on the left end surface of the push rod 626 in the vehicle width direction, and the push rod 626 is pushed to the right side of the vehicle width direction as the release cam 624 is rotated. Note that the cam body 625 is shaped such that the displacement of the push rod 626 is changed depending on a rotation angle of the release cam 624. In particular, as the rotation angle of the release cam 624 increases, the displacement of the push rod 626 increases. In addition, a clutch position sensor 554 for detecting a rotation angle of the release cam 624 is provided in the upper end of the release cam 624. Any one of various angular sensors known in the art may be employed as the clutch position sensor 554.

The first driving gear 621 and the first driven gear 623 mesh with each other by interposing the first intermediate gear 622 to transmit the rotary power. Using the first driving gear 621, the first driven gear 623, and the first intermediate gear 622, the rotary power of the clutch actuator motor 61 is decelerated and transmitted to the release cam 624. For example, as illustrated in FIG. 8, the first intermediate gear 622 includes a pair of two-stage gear sets. Each two-stage gear set has two gears having different numbers of teeth. These two gears are combined to coaxially rotate in synchronization. In addition, one of the two-stage gear sets has a large gear (having a greater number of teeth) meshing with the first driving gear 621 and a small gear (having a smaller number of teeth) meshing with the large gear of the other two-stage gear set. In addition, the other two-stage gear set has a small gear meshing with the first driven gear 623. Furthermore, the number of teeth of the first driving gear 621 is smaller than that of the first driven gear 623. In this configuration, the rotary power of the clutch actuator motor 61 is decelerated and transmitted to the release cam 624.

Note that the first driving force transmission mechanism 62 is not limited to this configuration. For example, the first driving force transmission mechanism 62 may not have the first intermediate gear 622, and the first driving gear 621 and the first driven gear 623 may directly mesh with each other. In this case, if the number of teeth of the first driving gear 621 is smaller than that of the first driven gear 623, the rotary power of the clutch actuator motor 61 is decelerated and transmitted to the release cam 624. Alternatively, the first intermediate gear 622 may have a single two-stage gear set, so that a large gear of the two-stage gear set meshes with the first driving gear 621, and a small gear meshes with the first driven gear 623. Shortly to say, any configuration may be employed as the first driving force transmission mechanism 62 as long as the rotary power of the clutch actuator motor 61 is decelerated and transmitted to the release cam 624 without changing the extending direction of the rotational center line. A deceleration ratio of the first driving force transmission mechanism 62 is not particularly limited.

The axial line D of the rotational shaft 611 of the clutch actuator motor 61 is in parallel with the axial line of the release cam 624. For this reason, all of the first driving gear 621, the first driven gear 623, and the first intermediate gear 622 have cylindrical gear profiles (in which the extending direction of the rotation center line of the transmitted rotary power does not change). In addition, the axial direction of the rotational shaft of the first intermediate gear 622 is also in parallel with the axial directions of the rotational shaft 611 of the clutch actuator motor 61 and the release cam 624.

As illustrated in FIG. 7, the clutch actuator motor 61 is disposed outward of the release cam 624 in the vehicle width direction. That is, the clutch actuator motor 61 is disposed apart outward from the outer side surface of the sprocket cover 47 relative to the release cam 624 in the vehicle width direction. In addition, the first intermediate gear 622 is disposed between the clutch actuator motor 61 and the release cam 624 in the vehicle width direction.

In this configuration, as the rotational shaft 611 of the clutch actuator motor 61 is rotated in a predetermined direction, the rotary power is transmitted to the release cam 624 through the first driving gear 621, the first intermediate gear 622, and the first driven gear 623. In addition, as the release cam 624 is rotated in a predetermined direction, the cam body 625 pushes the push rod 626 to the right side of the vehicle width direction. As described above, as the rotational angle of the release cam 624 increases, the displacement of the push rod 626 increases. For this reason, as the release cam 624 is rotated, the clutch 51 is sequentially switched from the clutch-connected state, to the half-clutch state, and to the clutch-disconnected state. Meanwhile, if the rotational shaft 611 of the clutch actuator motor 61 is rotated oppositely to the predetermined direction in the clutch-disconnected state, the push rod 626 is moved to the left side in the vehicle width direction. For this reason, the clutch 51 is sequentially switched from the clutch-disconnected state, to the half-clutch state, and to the clutch-connected state. In this manner, the clutch driving mechanism 6 of the AMT mechanism 5 switches the clutch 51 between the connection and disconnection states using the rotary power of the clutch actuator motor 61.

In this manner, the clutch driving mechanism 6 according to this embodiment transmits the rotary power of the clutch actuator motor 61 to the release cam 624 using a gear mechanism. In this configuration, unlike a configuration of the prior art in which a plurality of connecting members are used to rotate the release cam 624, it is possible to simplify the configuration of the first driving force transmission mechanism 62. For this reason, it is possible to reduce the size or the number of components of the AMT mechanism 5 and facilitate reduction of noise generated in the power transmission. In addition, it is possible to simplify the configuration of the first driving force transmission mechanism 62 or reduce the number of components. Therefore, it is possible to reduce a load of the clutch actuator motor 61 or a power transmission loss. Therefore, compared to the configuration of the prior art, a small-sized clutch actuator motor can be applied, and the size or weight of the AMT mechanism 5 can be reduced. Furthermore, it is possible to reduce the number of gears used in deceleration or the diameters of the gears. Since the number of components in the mechanism for manipulating the clutch 51 can be reduced, it is possible to reduce a weight of the clutch driving mechanism 6. Moreover, since the rotary power of the clutch actuator motor 61 is decelerated and transmitted to the release cam 624, it is possible to accurately and minutely control the rotation of the release cam 624 (that is, the displacement of the push rod 626).

(Gearshift Mechanism)

As illustrated in FIGS. 5 to 8, the gearshift mechanism 52 has a countershaft 521, a driveshaft 522, a plurality of driving gears 523, a plurality of driven gears 524, a shift cam 525, a shift fork 527, and a fork guide 526. In addition, the gearshift mechanism 52 is housed in the transmission chamber provided in the vicinity of the rear side inside the casing body 410 of the crankcase 41. The axial lines of the countershaft 521 and the driveshaft 522 are in parallel with each other and also with the vehicle width direction. In addition, the countershaft 521 is provided with a plurality of driving gears 523, and the driveshaft 522 is provided with a plurality of driven gears 524.

A plurality of driving gears 523 include a fixed gear, a slide gear, and a freewheel gear. A plurality of driven gears 524 include a slide gear and a freewheel gear. The fixed gear is fixed immovably in the axial directions of the countershaft 521 and the driveshaft 522 and is rotated in synchronization with each of the countershaft 521 and the driveshaft 522. The slide gear is rotated in synchronization with each of the countershaft 521 and the driveshaft 522 and can slidably move along the axial directions with respect to the countershaft 521 and the driveshaft 522. The freewheel gear is prohibited to move in the axial direction with respect to each of the countershaft 521 and the driveshaft 522, but can rotate relative to each of the countershaft 521 and the driveshaft 522. A predetermined fixed gear and a predetermined slide gear of the driving gears 523 mesh with a predetermined freewheel gear of the driven gears 524 at all times. In addition, a predetermined freewheel gear of the driving gears 523 meshes with a predetermined slide gear of the driven gears 524 at all times. The freewheel gears and the slide gears are provided with dogs. As the slide gear is moved in the axial direction, and the dog of the slide gear is engaged with the dog of neighboring freewheel gear, the slide gear and the freewheel gear are rotated in synchronization with each other.

The shift cam 525 is a circular columnar or cylindrical member rotatably housed in the transmission chamber of the crankcase 41. Note that the axial line (rotation center line) of the shift cam 525 is in parallel with the countershaft 521 and the driveshaft 522 and also with the vehicle width direction. The outer circumferential surface of the shift cam 525 is provided with a cam groove. A second driven gear 723 is provided in the vicinity of the left end of the shift cam 525 in the vehicle width direction (the end of the side where the end of the driveshaft 522 protrudes). In addition, a gearshift position sensor 555 for detecting a rotation angle of the shift cam 525 is provided in the left end of the shift cam 525 in the vehicle width direction. Any one of various angle sensors known in the art may be employed as the gearshift position sensor 555.

The fork guide 526 is a bar-shaped member, and its longitudinal direction is aligned in parallel with the axial lines of the crankshaft 45 and the driveshaft 522 and also with the vehicle width direction. The shift fork 527 is installed in the fork guide 526 reciprocatably in a slidable manner along the longitudinal direction and is actuated by the shift cam 525 in the longitudinal direction of the fork guide 526. The shift fork 527 is engaged with a predetermined slide gear, and a cam pin provided in the shift fork 527 is engaged with the cam groove of the shift cam 525. In this configuration, as the shift cam 525 is rotated, the shift fork 527 is moved, and the slide gear is moved accordingly. As a result, a power transmission path from the countershaft 521 to the driveshaft 522, that is, the gearshift position of the gearshift mechanism 52 is changed.

Note that, while the configuration of the gearshift mechanism 52 has been described just for illustrative purposes, the present invention is not limited by the aforementioned configuration of the gearshift mechanism 52. Shortly to say, any configuration may be employed as the gearshift mechanism 52 as long as the shift cam 525 has an axial line aligned in parallel with the vehicle width direction, and the gearshift position is changed using the rotation of the shift cam 525.

(Gearshift Driving Mechanism)

The gearshift driving mechanism 7 has a gearshift actuator motor 71 and a second driving force transmission mechanism 72. The gearshift actuator motor 71 is a driving power source of the gearshift position change operation (gearshift operation) of the gearshift mechanism 52. The second driving force transmission mechanism 72 transmits the rotary power of the gearshift actuator motor 71 to the shift cam 525 to rotate the shift cam 525. The second driving force transmission mechanism 72 has a second driving gear 721 provided in the rotational axis 711 of the gearshift actuator motor 71, a second driven gear 723 provided in the shift cam 525, and a second intermediate gear 722 meshing with the second driving gear 721 and the second driven gear 723. In addition, the gearshift driving mechanism 7 has a second gear casing 702 for housing each member of the second driving force transmission mechanism 72. Furthermore, the rotary power of the gearshift actuator motor 71 is transmitted to the shift cam 525 through the second driving gear 721, the second intermediate gear 722, and the second driven gear 723. The shift cam 525 is rotated by receiving the rotary power of the gearshift actuator motor 71 to move the shift fork 527 in the axial direction. In addition, by virtue of the movement of the shift fork 527, the slide gear is moved in the axial direction, and the engagement between the slide gear and the freewheel gear is switched. In this manner, the gearshift driving mechanism 7 changes the gearshift position of the gearshift mechanism 52 using the rotary power of the gearshift actuator motor 71.

A specific configuration of the second driving force transmission mechanism 72 will be described. The second driving gear 721 is installed to rotate in synchronization with the rotational shaft of the gearshift actuator motor 71 through spline coupling or the like. The second driven gear 723 is provided in the vicinity of the left end of the shift cam 525 in the vehicle width direction to rotate in synchronization with the shift cam 525. Furthermore, a gearshift position sensor 555 for detecting a rotational angle of the shift cam 525 is provided in the left end of the shift cam 525 in the vehicle width direction.

The second driving gear 721 and the second driven gear 723 mesh with each other by interposing the second intermediate gear 722 to transmit the rotary power. The rotary power of the gearshift actuator motor 71 is decelerated and transmitted to the shift cam 525 through the second driving gear 721, the second driven gear 723, and the second intermediate gear 722. For example, as illustrated in FIG. 6, the second intermediate gear 722 has a two-stage gear set. The two-stage gear set of the second intermediate gear 722 has a pair of gears having different number of teeth, and the pair of gears is combined to rotate coaxially in synchronization. In addition, a large gear (having a greater number of teeth) of the pair of gears meshes with the second driving gear 721, and a small gear (having a smaller number of teeth) meshes with the second driven gear 723. In addition, the number of teeth of the second driving gear 721 is smaller than that of the second driven gear 723. In this configuration, the rotary power of the gearshift actuator motor 71 is decelerated and transmitted to the shift cam 525.

Note that the configuration of the second driving force transmission mechanism 72 is not limited to those described above. For example, the second driving force transmission mechanism 72 may not have the second intermediate gear 722, and the second driving gear 721 and the second driven gear 723 may directly mesh with each other. In this case, if the number of teeth of the second driving gear 721 is smaller than that of the second driven gear 723, the rotary power of the gearshift actuator motor 71 is decelerated and transmitted to the shift cam 525. In addition, similar to the first driving force transmission mechanism 62 of the clutch driving mechanism 6, the second intermediate gear 722 may have a pair of two-stage gear sets. Shortly to say, any configuration may be employed in the second driving force transmission mechanism 72 as long as the rotary power of the gearshift actuator motor 71 is decelerated and transmitted to the shift cam 525 without changing the extending direction of the rotation center line. In addition, a deceleration ratio of the second driving force transmission mechanism 72 is not particularly limited.

Since the axial line F of the rotational shaft 711 of the gearshift actuator motor 71 is in parallel with the axial line of the shift cam 525, all of the second driving gear 721, the second driven gear 723, and the second intermediate gear 722 have cylindrical gear profiles. Note that the axial direction of the rotational shaft of the second intermediate gear 722 is also in parallel with the axial directions of the rotational shaft 711 of the gearshift actuator motor 71 and the shift cam 525.

Note that the gearshift actuator motor 71 and the second intermediate gear 722 are disposed outward of the shift cam 525 in the vehicle width direction. Furthermore, the second intermediate gear 722 is disposed between the shift cam 525 and the gearshift actuator motor 71 in the vehicle width direction, in particular, between the gearshift actuator motor 71 and the second driven gear 723 of the shift cam 525.

In this manner, the gearshift driving mechanism 7 of the AMT mechanism 5 according to this embodiment transmits the rotary power of the gearshift actuator motor 71 to the shift cam 525 using a gear mechanism. In this configuration, unlike the configuration of the prior art in which the release cam 624 is rotated by interposing a plurality of connecting members, it is possible to simplify the configuration of the second driving force transmission mechanism 72. For this reason, it is possible to reduce the size of the AMT mechanism 5 or the number of components or facilitate reduction of noise generated in the power transmission. In addition, it is possible to simplify the configuration of the second driving force transmission mechanism 72 or reduce the number of components. Therefore, it is possible to reduce a load of the gearshift actuator motor 71 or a power transmission loss. Therefore, compared to the configuration of the prior art, a small-sized gearshift actuator motor can be applied, and the size or weight of the AMT mechanism 5 can be reduced. Furthermore, it is possible to reduce the number of gears used in deceleration or the diameters of the gears. Since the number of components in the mechanism for manipulating the gearshift mechanism 52 can be reduced, it is possible to reduce a weight of the AMT mechanism 5. Moreover, since the rotary power of the gearshift actuator motor 71 is decelerated and transmitted to the shift cam 525, it is possible to accurately and minutely control a phase of the shift cam 525 (that is, the rotational position of the shift fork 527).

(Control System of AMT Mechanism)

Figure 9:
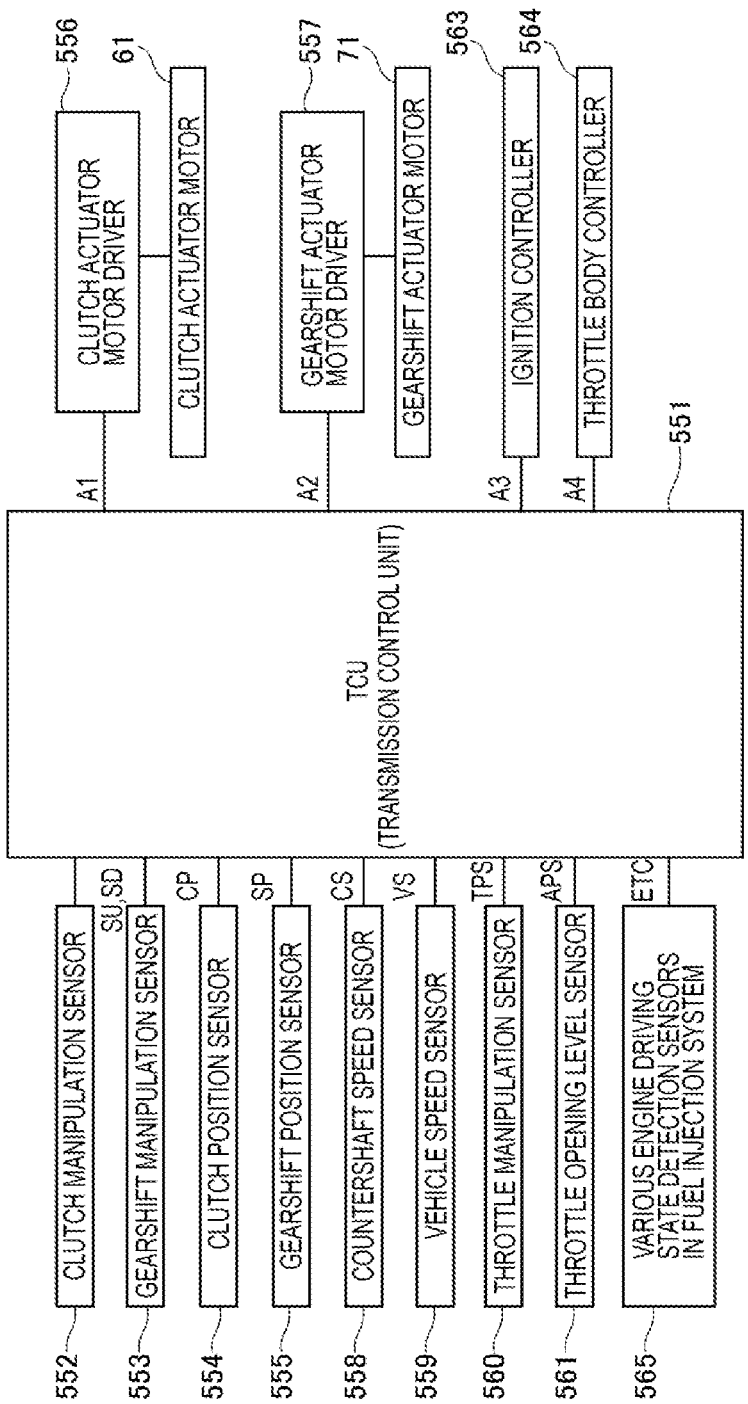
FIG. 9 is a block diagram illustrating an exemplary configuration of a control system of the AMT mechanism.

Here, a system for controlling the AMT mechanism 5 will be described with reference to FIG. 9. FIG. 9 is a block diagram illustrating exemplary configurations of main parts of the system for controlling the AMT mechanism 5.

A transmission control unit (TCU) 551 serves as a control unit for controlling the AMT mechanism 5. The TCU 551 is, for example, a computer having a central processing unit (CPU), a read-only memory (ROM), and a random access memory (RAM). A computer program or various types of setting information for controlling the AMT mechanism 5 are stored in the ROM in advance. The CPU reads the computer program stored in the ROM and executes it by using the RAM as a work area. In this case, various types of setting information stored in the ROM are appropriately read and referenced. As a result, control operations of the AMT mechanism 5 such as a change of the gearshift position of the gearshift mechanism 52 or switching between connection and disconnection of the clutch 51 are implemented.

As illustrated in FIG. 9, a clutch actuator motor driver 556, a gearshift actuator motor driver 557, an ignition controller 563, and a throttle body controller 564 are connected to the TCU 551 that controls the AMT mechanism 5. These are operated in response to operation signals A1 to A4 transmitted from the TCU 551. For example, the clutch actuator motor driver 556 drives the clutch actuator motor 61 under the control of the TCU 551. In addition, the gearshift actuator motor driver 557 drives the gearshift actuator motor 71 under the control of the TCU 551.

A clutch manipulation sensor 552, a gearshift manipulation sensor 553, a clutch position sensor 554, and a gearshift position sensor 555 are connected to the TCU 551. The clutch manipulation sensor 552 detects manipulation of the clutch lever 207 and outputs a detection signal representing a manipulation amount of the clutch lever 207. The gearshift manipulation sensor 553 detects whether an upshift or downshift manipulation is performed in the selector 414. In addition, when the upshift manipulation is detected, a gearshift detection signal SU is output to the TCU 551. When the downshift manipulation is detected, a gearshift detection signal SD is output to the TCU 551. The clutch position sensor 554 detects a rotation angle (that is, a clutch position) of the release cam 624 and outputs a clutch position signal CP representing the detection result to the TCU 551. The gearshift position sensor 555 detects a rotation angle of the shift cam 525 and outputs a gearshift position signal SP representing the rotation angle to the TCU 551.

Furthermore, a countershaft speed sensor 558, a vehicle speed sensor 559, a throttle manipulation sensor 560, and a throttle opening level sensor 561 are connected to the TCU 551. The countershaft speed sensor 558 detects a rotation speed of the countershaft 521 and outputs a rotation speed signal CS representing the rotation speed to the TCU 551. The vehicle speed sensor 559 detects a travel speed of the motorcycle 1 and outputs a vehicle speed signal VS representing the travel speed to the TCU 551. The throttle manipulation sensor 560 detects a manipulation amount of a throttle grip from a driver of the motorcycle 1 and outputs a throttle position signal TPS representing the manipulation amount to the TCU 551. The throttle opening level sensor 561 detects an opening level of the throttle valve of the throttle body 49 and outputs the throttle valve position signal APS representing the throttle opening level to the TCU 551.

Moreover, various engine driving state detection sensors 565 necessary in a fuel injection system are connected to the TCU 551. Such sensors 565 include, for example, a coolant temperature sensor, an intake temperature sensor, an oil temperature sensor, an oxygen sensor, and the like. Such sensors 565 output signals ETC representing corresponding detection values to the TCU 551.

If a driver manipulates the selector 414, the gearshift manipulation sensor 553 outputs any one of the gearshift detection signal SU or SD to the TCU 551 depending on the upshift manipulation or the downshift manipulation. If the TCU 551 receives the gearshift detection signal SU or SD, the output power of the engine unit 4 is controlled on the basis of various signals CP, SP, CS, VS, TPS, APS, and ETC output from the sensors. In addition, the gearshift position of the AMT mechanism 5 is changed by controlling the clutch actuator motor driver 556 and the gearshift actuator motor driver 557.

Specifically, first, the TCU 551 receives the gearshift detection signal SU or SD and drives the clutch actuator motor 61 using the clutch actuator motor driver 556 to switch the clutch 51 to the clutch-disconnected state. Then, the TCU 551 drives the gearshift actuator motor 71 using the gearshift actuator motor driver 557 to change the gearshift position of the AMT mechanism 5. Then, the TCU 551 stops the operation of the clutch actuator motor 61 using the clutch actuator motor driver 556 to switch the clutch 51 to the clutch-connected state.

The TCU 551 determines a driving status of the engine unit 4 on the basis of the input signals from various sensors when the gearshift position is changed by driving the gearshift actuator motor 71. For example, the TCU 551 controls an ignition controller 563 in an upshift operation to perform ignition cutting (ignition thinning) or retard ignition timings. In addition, in a downshift operation, the TCU 551 controls the throttle body controller 564 to perform blipping (idling). Through such process, the loads of dogs provided in the driving gears 523 and the driven gears 524 of the AMT mechanism 5 are reduced (or become zero). In addition, it is possible to smoothly change the gearshift position and reduce the time necessary to change the gearshift position.

The TCU 551 determines whether or not a shock (gearshift shock) generated in switching to the clutch-connected state is serious on the basis of the input signals from various sensors when the change of the gearshift position is completed, and the clutch 51 is switched to the clutch-connected state. If it is determined that the gearshift shock is more serious than a predetermined level, the TCU 551 controls the clutch actuator motor driver 556 such that the clutch 51 makes slow switching to the clutch-connected state, and the half-clutch state is retarded. As a result, it is possible to alleviate the shock.

(Control of AMT Mechanism)

Figure 10:
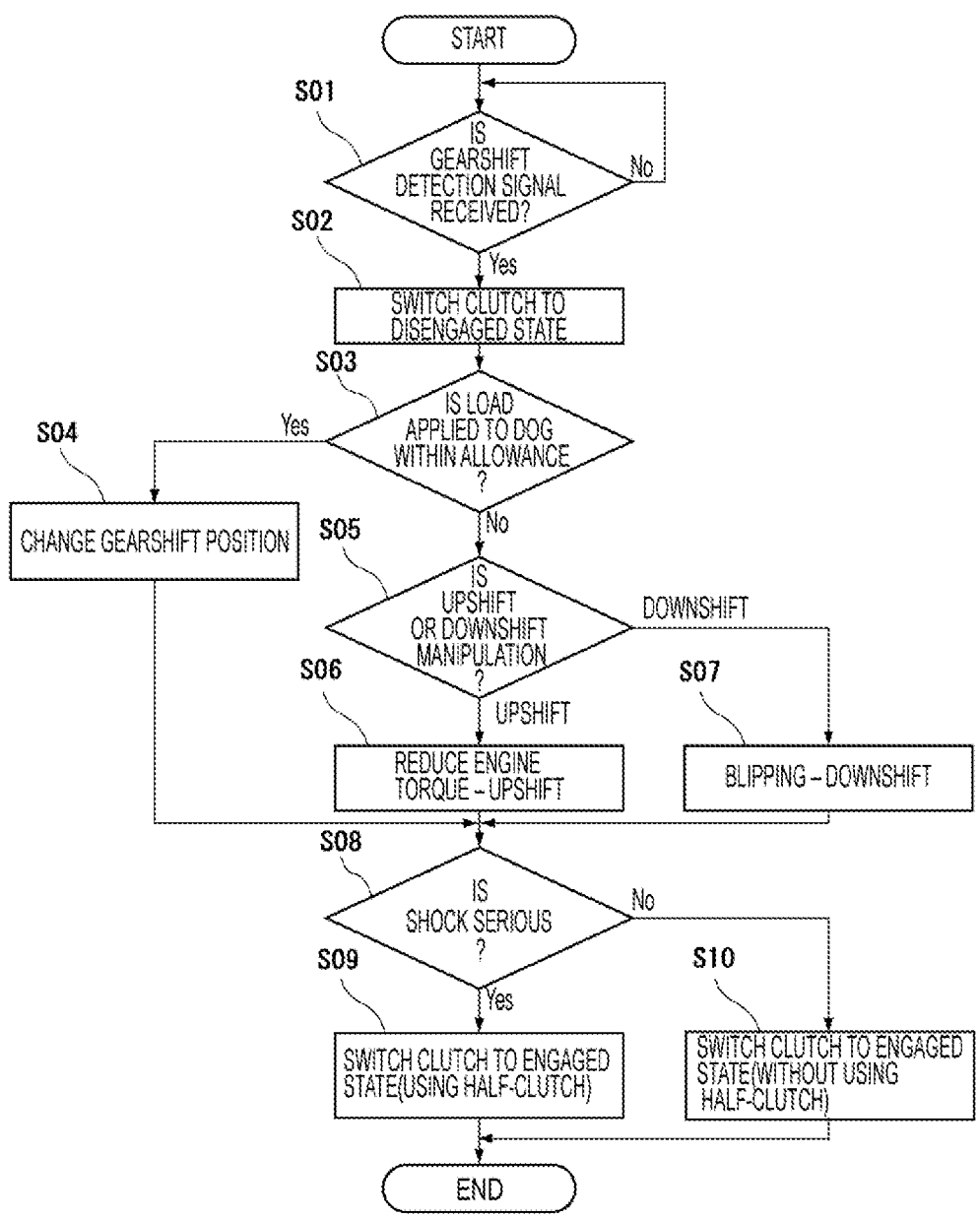
FIG. 10 is a flowchart illustrating a control sequence in the AMT mechanism 5 for changing a gearshift position.

Next, the control flow of the AMT mechanism 5 performed when the gearshift position is changed will be described with reference to FIG. 10. FIG. 10 is a flowchart illustrating the control of the AMT mechanism 5 when the gearshift position is changed.

In step S01, the TCU 551 determines whether or not the gearshift detection signal SU or SD is received from the gearshift manipulation sensor 553. If the TCU 551 does not receive any one of the gearshift detection signal SU or SD, the process waits in step S01. If the gearshift detection signal SU or SD received, the process advances to step S02.

In step S02, the TCU 551 switches the clutch 51 to the clutch-disconnected state. In addition, the process advances to step S03.

In step S03, the TCU 551 determines whether or not the load applied to the dogs provided in the driving gear 523 and the driven gear 524 of the AMT mechanism 5 are equal to or lower than an allowance. The TCU 551 performs this determination by referencing data from the countershaft speed sensor 558, the vehicle speed sensor 559, an oil temperature sensor (not shown), or a gearshift dog load map. If the load is equal to or lower than the allowance, the process advances to step S04. Otherwise, the process advances to step S05.

In step S04, the TCU 551 controls the gearshift actuator motor driver 557 such that the gearshift actuator motor 71 is driven to change the gearshift position. Then, the process advances to step S05.

In step S05, the TCU 551 determines whether the upshift or downshift manipulation is performed. If the gearshift detection signal SU is received in step S01, the TCU 551 determines that the upshift manipulation is performed. In this case, the process advances to step S06. Meanwhile, if the gearshift detection signal SD is received, the TCU 551 determines that the downshift manipulation is performed. In this case, the process advances to step S07.

In step S06, the TCU 551 performs the upshift operation while reducing the engine torque. The process advances to step S06 when the load of the dog is higher than the allowance, and the upshift manipulation is performed. In this case, the TCU 551 alleviates the load of the dog by reducing the engine torque in the upshift operation. As a method of reducing the engine torque, for example, an ignition cutting technique (ignition thinning) or an ignition timing retardation technique is employed. Through this process, it is possible to expedite the upshift operation by reducing the dog meshing time. Then, the process advances to step S08.

In step S07, the TCU 551 blips the engine unit 4 and then performs a downshift operation. The process advances to step S07 when the load of the dog is higher than the allowance, and the downshift operation is performed. In this case, the TCU 551 blips the engine unit in the downshift operation so that the load of the dog is reduced by matching the rotation speed between the driving gears 523 and the driven gears 524 of the AMT mechanism 5. For example, the TCU 551 performs the blipping by controlling the throttle body controller 564. Through this process, it is possible to reduce the dog meshing time and expedite the downshift operation. Then, the process advances to step S08.

In step S08, the TCU 551 determines whether or not a shock is more serious than a predetermined level when the clutch 51 is switched from the clutch-disconnected state to the clutch-connected state. The TCU 551 determines whether or not the shock is serious more than a predetermined level on the basis of a gearshift shock map obtained from the data such as the gearshift position, the engine rotation number, or the vehicle speed. If it is determined that the shock is more serious than the predetermined level, the process advances to step S09. If it is determined that the gearshift shock is less serious than the predetermined level, the process advances to step S10.

In step S09, the TCU 551 reduces the shock by slowly switching the clutch 51 from the clutch-disconnected state to the clutch-connected state. Meanwhile, in step S10, the TCU 551 rapidly switches the clutch 51 from the clutch-disconnected state to the clutch-connected state without using the half-clutch state. Through this process, the change of the gearshift position is completed.

As described above, the AMT mechanism 5 has the gearshift manipulation sensor 553 that detects a pivot manipulation of the selector 414 and outputs the shift detection signal SU or SD. The TCU 551 drives the clutch actuator motor 61 and the gearshift actuator motor 71 to change the gearshift position when the shift detection signal SU or SD is received.

The gearshift manipulation sensor 553 outputs the gearshift detection signal SU or SD to the TCU 551 nearly simultaneously when a pivot manipulation of the selector 414 starts. In addition, if the gearshift detection signal SU or SD is received, the TCU 551 drives the clutch actuator motor 61 and the gearshift actuator motor 71 to change the gearshift position. In this configuration, it is possible to shorten a time lag from the start of the manipulation of the selector 414 to the start of the gearshift position change. Therefore, it is possible to obtain a sporty control feeling like a manual transmission.

A pivot detection position is set between a pivot start position and a pivot end position of the selector 414. The gearshift manipulation sensor 553 outputs the gearshift detection signal SU or SD when the selector 414 passes over the pivot detection position. The TCU 551 operates the clutch actuator motor 61 and the gearshift actuator motor 71 to finish the gearshift position change by receiving the gearshift detection signal SU or SD before the selector 414 is pivoted to the pivot end position.

In this configuration, the AMT mechanism 5 completes the gearshift position change before the selector 414 is pivoted from the pivot start position through the pivot detection position to the pivot end position. For this reason, it is possible to remarkably shorten the time elapsing from the start of manipulation of the selector 414 to the completion of the gearshift position change and obtain a gearshift response similar or superior to that of a manual transmission (MT).

Note that the gearshift position change operation or the clutch connection/disconnection operation using the TCU 551 is just for illustrative purposes, and the invention is not limited thereto.

While preferred embodiments of the invention have been described and illustrated hereinbefore, it should be understood that they are only for exemplary purposes and are not to be construed as limitations. Any addition, omission, substitution, or modification may be possible without departing from the spirit or scope of the present invention.

Although the engine unit is an in-line four-cylinder engine in the embodiments described above, the number of cylinders provided in the engine unit is not particularly limited. Shortly to say, any configuration may be employed in the engine unit as long as the engine unit has a crankcase and a cylinder block, and the crankcase has a portion positioned outward of the cylinder block in the vehicle width direction. In addition, although the magnet cover is the "portion positioned outward of the cylinder block in the vehicle width direction" in the aforementioned embodiment, any portion may be positioned outward without limiting to the magnet cover.

Although the vehicle according to the present invention is a saddle type on-road motorcycle in the aforementioned embodiment, a vehicle applicable to the present invention is not limited to the on-road motorcycle. The present invention may also be applied to an off-road motorcycle as long as the engine unit has the aforementioned configuration. Furthermore, the vehicle according to the present invention is not limited to a motorcycle. For example, the present invention may also be applied to other types of vehicles such as a four-wheel buggy car.

The present invention can be effectively applied to a vehicle having an engine unit provided with the AMT mechanism. According to the present invention, it is possible to improve the cooling effect of the actuator of the AMT mechanism without increasing the size of the engine unit.

According to the present invention, at least a part of the clutch actuator is positioned outward of the cylinder block in the vehicle width direction as seen in the front view. In this configuration, the clutch actuator is easily exposed to the air blowing from the front without increasing the size of the engine unit. Therefore, it is possible to facilitate cooling of the clutch actuator motor using the air blowing from the front.

What is claimed is:

1. A vehicle having an engine unit, the engine unit comprising:
    a crankcase provided with a crankshaft, a gearshift mechanism configured to perform a gearshift operation for rotary power transmitted from the crankshaft, and a clutch configured to connect or disconnect transmission of the rotary power between the crankshaft and the gearshift mechanism;
    a cylinder block internally provided with a cylinder and disposed on the crankcase, and
    a clutch actuator motor serving as a power source for switching the clutch between connection and disconnection states,
    wherein at least a part of the clutch actuator motor is positioned outward of an outer side surface of the cylinder block in a vehicle width direction as seen in a front-rear direction of the vehicle,
    wherein an axial direction of a rotational shaft of the clutch actuator motor is approximately in parallel with an axial direction of the cylinder of the cylinder block, and
    wherein the clutch actuator motor is disposed along a rear side of the cylinder block as seen in the vehicle width direction.

2. The vehicle having the engine unit according to claim 1, wherein the crankcase has a portion positioned outward of the cylinder block in the vehicle width direction as seen in the front-rear direction of the vehicle,
    the clutch actuator motor is disposed inward of an outer side surface of the portion of the crankcase in the vehicle width direction as seen in the front-rear direction of the vehicle, and
    a part of the clutch actuator motor is positioned over the portion of the crankcase.

3. The vehicle having the engine unit according to claim 2, further comprising a power transmission member provided to rotate in synchronization with a rotation output shaft of the gearshift mechanism outside the crankcase and transmit rotation of the rotation output shaft to a propulsion wheel; and
    a covering member installed in the crankcase to cover the power transmission member,
    wherein the clutch actuator motor is disposed inward from the outermost side surface of the portion in the vehicle width direction outside the covering member in the vehicle width direction.

4. The vehicle having the engine unit according to claim 1, further comprising:
    a release cam rotated to switch the clutch between connection and disconnection states;
    a first driving gear provided in a rotational shaft of the clutch actuator motor and rotated in synchronization with the rotational shaft; and
    a first driven gear provided in the release cam and rotated in synchronization with the release cam,
    wherein the first driving gear and the first driven gear mesh with each other directly or by interposing a first intermediate gear, and
    the release cam is rotated by the rotary power of the clutch actuator motor transmitted through the first driving gear and the first driven gear to switch the clutch between connection and disconnection states.

5. The vehicle having the engine unit according to claim 1, further comprising a gearshift actuator motor serving as a power source for changing a gearshift position of the gearshift mechanism,
    wherein the crankcase has a portion positioned outward of the cylinder block in the vehicle width direction as seen in the front-rear direction of the vehicle, and
    the gearshift actuator motor is disposed at the rear of the cylinder block as seen in the vehicle width direction and inward of the outermost side surface of the portion of the crankcase in the vehicle width direction as seen in the front-rear direction of the vehicle.

6. The vehicle having the engine unit according to claim 5, wherein the gearshift actuator motor is disposed at the rear of the clutch actuator motor as seen in the vehicle width direction, and
the gearshift actuator motor partially overlaps with the clutch actuator motor as seen in the front-rear direction of the vehicle.

7. The vehicle having the engine unit according to claim 5, wherein an axial line of a rotational shaft of the gearshift actuator motor is intersected with an axial line of a rotational shaft of the clutch actuator motor as seen in the front-rear direction of the vehicle.

8. The vehicle having the engine unit according to claim 5, further comprising:
a power transmission member provided to rotate in synchronization with a rotation output shaft of the gearshift mechanism in a position different from that of the portion of the crankcase outside in the vehicle width direction and transmit rotation of the rotation output shaft to a propulsion wheel; and
a covering member installed in the crankcase to cover the power transmission member,
wherein the gearshift actuator motor is disposed outward of the covering member in the vehicle width direction.

9. The vehicle having the engine unit according to claim 5, further comprising:
a shift cam rotated to change a gearshift position of the gearshift mechanism;
a second driving gear provided in a rotational shaft of the gearshift actuator motor and rotated in synchronization with the rotational shaft; and
a second driven gear provided in the shift cam and rotated in synchronization with the shift cam,
wherein the second driving gear and the second driven gear mesh with each other directly or by interposing a second intermediate gear, and
the shift cam is rotated by the rotary power of the gearshift actuator motor transmitted through the second driving gear and the second driven gear to change the gearshift position of the gearshift mechanism.

10. A vehicle having an engine unit,
the engine unit comprising:
a crankcase provided with a crankshaft, a gearshift mechanism configured to perform a gearshift operation for rotary power transmitted from the crankshaft, and a clutch configured to connect or disconnect transmission of the rotary power between the crankshaft and the gearshift mechanism, wherein the crankcase has a portion positioned outward of the cylinder block in the vehicle width direction as seen in the front-rear direction of the vehicle,
a cylinder block internally provided with a cylinder and disposed on the crankcase, and
a clutch actuator motor serving as a power source for switching the clutch between connection and disconnection states, the clutch actuator motor is disposed inward of an outer side surface of the portion of the crankcase in the vehicle width direction as seen in the front-rear direction of the vehicle,
wherein at least a part of the clutch actuator motor is positioned outward of an outer side surface of the cylinder block in a vehicle width direction as seen in a front-rear direction of the vehicle, and
a part of the clutch actuator motor is positioned over the portion of the crankcase.

11. The vehicle having the engine unit according to claim 10, wherein an axial direction of a rotational shaft of clutch actuator motor is approximately in parallel with an axial direction of the cylinder of the cylinder block, and
the clutch actuator motor is disposed along a rear side of the cylinder block as seen in the vehicle width direction.

12. The vehicle having the engine unit according to claim 10, further comprising a power transmission member provided to rotate in synchronization with a rotation output shaft of the gearshift mechanism outside the crankcase and transmit rotation of the rotation output shaft to a propulsion wheel; and
a covering member installed in the crankcase to cover the power transmission member,
wherein the clutch actuator motor is disposed inward from the outermost side surface of the portion in the vehicle width direction outside the covering member in the vehicle width direction.

13. The vehicle having the engine unit according to claim 10, further comprising:
a release cam rotated to switch the clutch between connection and disconnection states;
a first driving gear provided in a rotational shaft of the clutch actuator motor and rotated in synchronization with the rotational shaft; and
a first driven gear provided in the release cam and rotated in synchronization with the release cam,
wherein the first driving gear and the first driven gear mesh with each other directly or by interposing a first intermediate gear, and
the release cam is rotated by the rotary power of the clutch actuator motor transmitted through the first driving gear and the first driven gear to switch the clutch between connection and disconnection states.

14. The vehicle having the engine unit according to claim 10, further comprising a gearshift actuator motor serving as a power source for changing a gearshift position of the gearshift mechanism,
wherein the crankcase has a portion positioned outward of the cylinder block in the vehicle width direction as seen in the front-rear direction of the vehicle, and
the gearshift actuator motor is disposed at the rear of the cylinder block as seen in the vehicle width direction and inward of the outermost side surface of the portion of the crankcase in the vehicle width direction as seen in the front-rear direction of the vehicle.

15. The vehicle having the engine unit according to claim 14, wherein the gearshift actuator motor is disposed at the rear of the clutch actuator motor as seen in the vehicle width direction, and
the gearshift actuator motor partially overlaps with the clutch actuator motor as seen in the front-rear direction of the vehicle.

16. The vehicle having the engine unit according to claim 14, wherein an axial line of a rotational shaft of the gearshift actuator motor is intersected with an axial line of a rotational shaft of the clutch actuator motor as seen in the front-rear direction of the vehicle.

17. The vehicle having the engine unit according to claim 14, further comprising:
a power transmission member provided to rotate in synchronization with a rotation output shaft of the gearshift mechanism in a position different from that of the portion of the crankcase outside in the vehicle width direction and transmit rotation of the rotation output shaft to a propulsion wheel; and
a covering member installed in the crankcase to cover the power transmission member, wherein the gearshift actuator motor is disposed outward of the covering member in the vehicle width direction.

18. The vehicle having the engine unit according to claim 14, further comprising:
- a shift cam rotated to change a gearshift position of the gearshift mechanism;
- a second driving gear provided in a rotational shaft of the gearshift actuator motor and rotated in synchronization with the rotational shaft; and
- a second driven gear provided in the shift cam and rotated in synchronization with the shift cam,
- wherein the second driving gear and the second driven gear mesh with each other directly or by interposing a second intermediate gear, and
- the shift cam is rotated by the rotary power of the gearshift actuator motor transmitted through the second driving gear and the second driven gear to change the gearshift position of the gearshift mechanism.

\* \* \* \* \*